(12) United States Patent
Nelson, Jr. et al.

(10) Patent No.: US 8,509,268 B2
(45) Date of Patent: **\*Aug. 13, 2013**

(54) MINIMAL MAINTENANCE LINK TO SUPPORT SYCHRONIZATION

(75) Inventors: G. Rodney Nelson, Jr., Merritt Island, FL (US); John E. Hoffmann, Indialantic, FL (US); Antoine J. Rouphael, Escondido, CA (US); James A. Proctor, Jr., Indialantic, FL (US)

(73) Assignee: Intel Corporation, Santa Clara, CA (US)

( \* ) Notice: Subject to any disclaimer, the term of this patent is extended or adjusted under 35 U.S.C. 154(b) by 0 days.

This patent is subject to a terminal disclaimer.

(21) Appl. No.: 13/335,575

(22) Filed: Dec. 22, 2011

(65) Prior Publication Data

US 2012/0093131 A1    Apr. 19, 2012

Related U.S. Application Data

(63) Continuation of application No. 09/778,474, filed on Feb. 7, 2001, now Pat. No. 8,175,120.

(60) Provisional application No. 60/180,598, filed on Feb. 7, 2000.

(51) Int. Cl.
*H04J 3/06* (2006.01)
*H04W 4/00* (2009.01)

(52) U.S. Cl.
USPC ............ 370/503; 370/328; 370/329; 455/450

(58) Field of Classification Search
USPC ................ 370/311, 328, 329, 335, 342, 338, 370/503, 441; 455/450, 509, 522
See application file for complete search history.

(56) References Cited

U.S. PATENT DOCUMENTS 3,560,978 A   2/1971  Himmel et al.
3,725,938 A   4/1973  Black et al.
(Continued)

FOREIGN PATENT DOCUMENTS

DE  2812575     9/1979
EP  0 443 061   8/1991
(Continued)

OTHER PUBLICATIONS

Attachment 2, *High Speed Data RLP* Lucent Technologies, Version 0.1, Jan. 16, 1997.
(Continued)

*Primary Examiner* — Hassan Phillips
*Assistant Examiner* — Saba Tsegaye
(74) *Attorney, Agent, or Firm* — Blakely, Sokoloff, Taylor & Zafman LLP

(57) ABSTRACT

A method for use in a field unit operable in a wireless communication network. The method includes receiving an indication of a plurality of access identifiers from a base station. The field unit selects an access identifier from the plurality of access identifiers received from the base station. The selected access identifier is associated with a type of field unit request. The field unit transmits the selected access identifier to the base station. The field unit then receives a message from the base station. The message is based on the transmitted selected access identifier. The message contains a timing adjustment that indicates an amount to advance timing. A corresponding field unit apparatus, a base station method, and corresponding base station apparatus is also disclosed.

33 Claims, 8 Drawing Sheets

(56) References Cited

U.S. PATENT DOCUMENTS

| | | | |
|---|---|---|---|
| 3,742,498 | A | 6/1973 | Dunn |
| 3,846,799 | A | 11/1974 | Gueguen |
| 3,950,753 | A | 4/1976 | Chisholm |
| 4,021,813 | A | 5/1977 | Black et al. |
| 4,099,184 | A | 7/1978 | Rapshys |
| 4,107,469 | A | 8/1978 | Jenkins |
| 4,170,766 | A | 10/1979 | Pridham et al. |
| 4,260,994 | A | 4/1981 | Parker |
| 4,290,071 | A | 9/1981 | Fenwick |
| 4,387,378 | A | 6/1983 | Henderson |
| 4,488,155 | A | 12/1984 | Wu |
| 4,577,316 | A | 3/1986 | Schiff |
| 4,599,733 | A | 7/1986 | Gutleber |
| 4,625,308 | A | 11/1986 | Kim et al. |
| 4,631,546 | A | 12/1986 | Dumas et al. |
| 4,642,806 | A | 2/1987 | Hewitt et al. |
| 4,675,863 | A | 6/1987 | Paneth et al. |
| 4,700,197 | A | 10/1987 | Milne |
| 4,817,089 | A | 3/1989 | Paneth et al. |
| 4,841,526 | A | 6/1989 | Wilson et al. |
| 4,862,453 | A | 8/1989 | West et al. |
| 4,866,709 | A | 9/1989 | West et al. |
| 4,887,266 | A | 12/1989 | Neve et al. |
| 4,901,307 | A | 2/1990 | Gilhousen et al. |
| 4,912,705 | A | 3/1990 | Paneth et al. |
| 4,949,395 | A | 8/1990 | Rydbeck |
| 4,954,950 | A | 9/1990 | Freeman et al. |
| 5,022,024 | A | 6/1991 | Paneth et al. |
| 5,027,125 | A | 6/1991 | Tang |
| 5,027,348 | A | 6/1991 | Curry, Jr. |
| 5,027,400 | A | 6/1991 | Baji et al. |
| 5,038,149 | A | 8/1991 | Aubry et al. |
| 5,056,109 | A | 10/1991 | Gilhousen et al. |
| 5,068,916 | A | 11/1991 | Harrison et al. |
| 5,101,416 | A | 3/1992 | Fenton et al. |
| 5,103,459 | A | 4/1992 | Gilhousen et al. |
| 5,114,375 | A | 5/1992 | Wellhausen et al. |
| 5,115,309 | A | 5/1992 | Hang |
| 5,117,236 | A | 5/1992 | Chang et al. |
| 5,124,981 | A | 6/1992 | Golding |
| 5,130,983 | A | 7/1992 | Heffner, III |
| 5,166,929 | A | 11/1992 | Lo |
| 5,226,044 | A | 7/1993 | Gupta et al. |
| 5,229,996 | A * | 7/1993 | Backstrom et al. ........... 370/507 |
| 5,235,343 | A | 8/1993 | Audren et al. |
| 5,257,283 | A | 10/1993 | Gilhousen et al. |
| 5,267,262 | A | 11/1993 | Wheatley, III |
| 5,268,900 | A | 12/1993 | Hluchyj et al. |
| 5,280,472 | A | 1/1994 | Gilhousen et al. |
| 5,282,222 | A | 1/1994 | Fattouche et al. |
| 5,293,172 | A | 3/1994 | Lamberty et al. |
| 5,294,939 | A | 3/1994 | Sanford et al. |
| 5,303,240 | A | 4/1994 | Borras et al. |
| 5,325,394 | A | 6/1994 | Bruckert |
| 5,325,419 | A | 6/1994 | Connolly et al. |
| 5,337,316 | A | 8/1994 | Weiss et al. |
| 5,339,316 | A | 8/1994 | Diepstraten |
| 5,353,332 | A | 10/1994 | Raith et al. |
| 5,355,374 | A | 10/1994 | Hester et al. |
| 5,373,502 | A | 12/1994 | Turban |
| 5,375,124 | A | 12/1994 | D'Ambrogio et al. |
| 5,377,192 | A | 12/1994 | Goodings et al. |
| 5,388,102 | A | 2/1995 | Griffith et al. |
| 5,394,473 | A | 2/1995 | Davidson |
| 5,412,429 | A | 5/1995 | Glover |
| 5,414,728 | A | 5/1995 | Zehavi |
| 5,422,887 | A | 6/1995 | Diepstraten et al. |
| 5,430,452 | A | 7/1995 | DuBois |
| 5,437,055 | A | 7/1995 | Wheatley, III |
| 5,442,625 | A | 8/1995 | Gitlin et al. |
| 5,446,727 | A | 8/1995 | Bruckert et al. |
| 5,463,629 | A | 10/1995 | Ko |
| 5,471,463 | A | 11/1995 | Hulbert |
| 5,471,649 | A * | 11/1995 | Rees et al. ................. 455/67.14 |
| 5,479,176 | A | 12/1995 | Zavrel, Jr. |
| 5,481,533 | A | 1/1996 | Honig et al. |
| 5,487,180 | A | 1/1996 | Ohtake |
| 5,490,136 | A | 2/1996 | Sereno et al. |
| 5,493,569 | A | 2/1996 | Buchholz et al. |
| 5,502,447 | A | 3/1996 | Kumpfbeck et al. |
| 5,511,068 | A | 4/1996 | Sato |
| 5,537,397 | A | 7/1996 | Abramson |
| 5,537,414 | A | 7/1996 | Takiyasu et al. |
| 5,550,828 | A | 8/1996 | Gries et al. |
| 5,559,789 | A | 9/1996 | Nakano et al. |
| 5,577,022 | A | 11/1996 | Padovani et al. |
| 5,581,575 | A | 12/1996 | Zehavi et al. |
| 5,585,850 | A | 12/1996 | Schwaller |
| 5,586,119 | A | 12/1996 | Scribano et al. |
| 5,590,409 | A | 12/1996 | Sawahashi et al. |
| 5,592,178 | A | 1/1997 | Chang et al. |
| 5,592,468 | A | 1/1997 | Sato |
| 5,592,470 | A | 1/1997 | Rudrapatna et al. |
| 5,592,471 | A | 1/1997 | Briskman |
| 5,598,416 | A | 1/1997 | Yamada et al. |
| 5,598,417 | A | 1/1997 | Crisler et al. |
| 5,604,730 | A | 2/1997 | Tiedemann, Jr. |
| 5,606,580 | A | 2/1997 | Mourot et al. |
| 5,617,102 | A | 4/1997 | Prater |
| 5,617,423 | A | 4/1997 | Li et al. |
| 5,619,492 | A | 4/1997 | Press et al. |
| 5,619,524 | A | 4/1997 | Ling et al. |
| 5,621,752 | A | 4/1997 | Antonio et al. |
| 5,634,199 | A | 5/1997 | Gerlach et al. |
| 5,642,348 | A | 6/1997 | Barzegar et al. |
| 5,642,377 | A | 6/1997 | Chung et al. |
| 5,652,764 | A | 7/1997 | Kanzaki et al. |
| 5,655,001 | A | 8/1997 | Cline et al. |
| 5,657,326 | A | 8/1997 | Burns et al. |
| 5,657,358 | A | 8/1997 | Panech et al. |
| 5,663,958 | A | 9/1997 | Ward |
| 5,663,990 | A | 9/1997 | Bolgiano et al. |
| 5,673,259 | A | 9/1997 | Quick, Jr. |
| 5,680,142 | A | 10/1997 | Smith et al. |
| 5,684,794 | A | 11/1997 | Lopez et al. |
| 5,687,194 | A | 11/1997 | Paneth et al. |
| 5,689,502 | A | 11/1997 | Scott |
| 5,697,059 | A | 12/1997 | Carney |
| 5,699,364 | A | 12/1997 | Sato et al. |
| 5,708,656 | A | 1/1998 | Noneman et al. |
| 5,712,869 | A | 1/1998 | Lee et al. |
| 5,715,236 | A | 2/1998 | Gilhousen et al. |
| 5,726,981 | A | 3/1998 | Ylitervo et al. |
| 5,734,646 | A | 3/1998 | I et al. |
| 5,739,784 | A | 4/1998 | Jan et al. |
| 5,742,592 | A | 4/1998 | Scholefield et al. |
| 5,745,484 | A | 4/1998 | Scott |
| 5,758,288 | A | 5/1998 | Dunn et al. |
| 5,764,648 | A | 6/1998 | Yamane et al. |
| 5,767,807 | A | 6/1998 | Pritchett |
| 5,781,542 | A | 7/1998 | Tanaka et al. |
| 5,781,543 | A | 7/1998 | Ault et al. |
| 5,784,406 | A | 7/1998 | DeJaco et al. |
| 5,790,549 | A | 8/1998 | Dent |
| 5,790,551 | A | 8/1998 | Chan |
| 5,793,744 | A | 8/1998 | Kanerva et al. |
| 5,802,046 | A | 9/1998 | Scott |
| 5,802,465 | A | 9/1998 | Hamalainen et al. |
| 5,805,994 | A | 9/1998 | Perrault et al. |
| 5,812,131 | A | 9/1998 | Bertram |
| 5,825,807 | A | 10/1998 | Kumar |
| 5,828,659 | A | 10/1998 | Teder et al. |
| 5,828,662 | A | 10/1998 | Jalali et al. |
| 5,838,720 | A | 11/1998 | Morelli |
| 5,841,768 | A | 11/1998 | Ozluturk et al. |
| 5,844,894 | A | 12/1998 | Dent |
| 5,845,211 | A | 12/1998 | Roach |
| 5,854,786 | A | 12/1998 | Henderson et al. |
| 5,856,971 | A | 1/1999 | Gitlin et al. |
| 5,859,840 | A | 1/1999 | Tiedemann, Jr. et al. |
| 5,859,879 | A | 1/1999 | Bolgiano et al. |
| 5,862,476 | A | 1/1999 | Hasegawa |
| 5,867,527 | A | 2/1999 | Ziv et al. |
| 5,872,786 | A | 2/1999 | Shobatake |

| | | | | | | |
|---|---|---|---|---|---|---|
| 5,873,043 A | 2/1999 | Comer | | 6,157,619 A | 12/2000 | Ozluturk et al. |
| 5,881,060 A | 3/1999 | Morrow et al. | | 6,161,013 A | 12/2000 | Anderson et al. |
| 5,881,368 A | 3/1999 | Grob et al. | | 6,163,707 A | 12/2000 | Miller |
| 5,884,196 A | 3/1999 | Lekven et al. | | 6,169,731 B1 | 1/2001 | Stewart et al. |
| 5,892,774 A | 4/1999 | Zehavi et al. | | 6,169,759 B1 | 1/2001 | Kanterakis et al. |
| 5,892,793 A | 4/1999 | Gibson | | 6,185,184 B1 | 2/2001 | Mattaway et al. |
| 5,893,035 A | 4/1999 | Chen | | 6,185,266 B1 | 2/2001 | Kuchi et al. |
| 5,894,473 A | 4/1999 | Dent | | 6,188,678 B1 | 2/2001 | Prescott |
| 5,896,374 A | 4/1999 | Okumura et al. | | 6,188,903 B1 | 2/2001 | Gardner et al. |
| 5,896,376 A | 4/1999 | Alperovich et al. | | 6,195,362 B1 | 2/2001 | Darcie et al. |
| 5,898,929 A | 4/1999 | Haartsen | | 6,198,723 B1 | 3/2001 | Parruck et al. |
| 5,903,834 A | 5/1999 | Wallstedt et al. | | 6,201,966 B1 | 3/2001 | Rinne et al. |
| 5,905,473 A | 5/1999 | Taenzer | | 6,208,871 B1 | 3/2001 | Hall et al. |
| 5,910,944 A | 6/1999 | Callicotte et al. | | 6,212,175 B1 | 4/2001 | Harsch |
| 5,910,945 A | 6/1999 | Garrison et al. | | 6,212,220 B1 | 4/2001 | Proctor, Jr. et al. |
| 5,914,950 A | 6/1999 | Tiedemann, Jr. et al. | | 6,214,342 B1 | 4/2001 | Alberici et al. |
| 5,915,216 A | 6/1999 | Lysejko | | 6,215,798 B1 | 4/2001 | Carneheim et al. |
| 5,918,170 A | 6/1999 | Oksanen et al. | | 6,219,342 B1 | 4/2001 | Rege |
| 5,923,650 A | 7/1999 | Chen et al. | | 6,222,828 B1 | 4/2001 | Ohlson et al. |
| 5,926,500 A | 7/1999 | Odenwalder | | 6,222,832 B1 | 4/2001 | Proctor |
| 5,930,230 A | 7/1999 | Odenwalder et al. | | 6,222,873 B1 | 4/2001 | Bang et al. |
| 5,933,781 A | 8/1999 | Willenegger et al. | | 6,226,279 B1 | 5/2001 | Hansson et al. |
| 5,943,362 A | 8/1999 | Saito | | 6,226,527 B1 | 5/2001 | Dalsgaard et al. |
| 5,946,356 A | 8/1999 | Felix et al. | | 6,233,439 B1 | 5/2001 | Jalali |
| 5,950,131 A | 9/1999 | Vilmur | | 6,236,646 B1 | 5/2001 | Beming et al. |
| 5,956,332 A | 9/1999 | Rasanen et al. | | 6,236,647 B1 | 5/2001 | Amalfitano |
| 5,959,980 A | 9/1999 | Scott | | 6,236,674 B1 | 5/2001 | Morelli et al. |
| 5,960,361 A | 9/1999 | Chen | | 6,243,372 B1 | 6/2001 | Petch et al. |
| 5,963,559 A | 10/1999 | Ohki | | 6,246,673 B1 | 6/2001 | Tiedemann, Jr. et al. |
| 5,966,374 A | 10/1999 | Rasanen | | 6,246,715 B1 | 6/2001 | Park et al. |
| 5,974,036 A | 10/1999 | Acharya et al. | | RE37,301 E | 7/2001 | Lo |
| 5,982,760 A | 11/1999 | Chen | | 6,256,509 B1 | 7/2001 | Tanaka et al. |
| 5,990,806 A | 11/1999 | Mock et al. | | 6,259,683 B1 | 7/2001 | Sekine et al. |
| 5,991,279 A | 11/1999 | Haugli et al. | | 6,262,980 B1 | 7/2001 | Leung et al. |
| 5,991,284 A | 11/1999 | Willenegger et al. | | 6,263,013 B1 | 7/2001 | Hendrickson |
| 5,991,618 A | 11/1999 | Hall | | 6,269,075 B1 | 7/2001 | Tran |
| 6,001,800 A | 12/1999 | Mehta et al. | | 6,269,088 B1 | 7/2001 | Masui et al. |
| 6,002,690 A | 12/1999 | Takayama et al. | | 6,272,168 B1 | 8/2001 | Lomp et al. |
| 6,005,852 A | 12/1999 | Kokko et al. | | 6,272,354 B1 | 8/2001 | Saario |
| 6,005,855 A | 12/1999 | Zehavi et al. | | 6,275,478 B1 | 8/2001 | Tiedemann, Jr. |
| 6,009,106 A | 12/1999 | Rustad et al. | | 6,278,701 B1 | 8/2001 | Ayyagari et al. |
| 6,011,800 A | 1/2000 | Nadgauda et al. | | 6,285,665 B1 | 9/2001 | Chuah |
| 6,016,312 A | 1/2000 | Storm et al. | | 6,292,474 B1 | 9/2001 | Ali et al. |
| 6,028,868 A | 2/2000 | Yeung et al. | | 6,301,286 B1 | 10/2001 | Kanterakis et al. |
| 6,031,827 A | 2/2000 | Rikkinen et al. | | 6,301,291 B1 | 10/2001 | Rouphael et al. |
| 6,031,832 A | 2/2000 | Turina | | 6,304,215 B1 | 10/2001 | Proctor, Jr. et al. |
| 6,034,638 A | 3/2000 | Thiel et al. | | 6,307,840 B1 | 10/2001 | Wheatley, III et al. |
| 6,037,905 A | 3/2000 | Koscica et al. | | 6,310,859 B1 | 10/2001 | Morita et al. |
| 6,038,450 A | 3/2000 | Brink et al. | | 6,314,300 B1 | 11/2001 | Nakashima et al. |
| 6,049,535 A | 4/2000 | Ozukturk et al. | | 6,317,092 B1 | 11/2001 | de Schweinitz et al. |
| 6,049,538 A | 4/2000 | Scott | | 6,320,851 B1 | 11/2001 | Kim et al. |
| 6,052,385 A | 4/2000 | Kanerva et al. | | 6,332,008 B1 | 12/2001 | Giallorenzi et al. |
| 6,058,338 A | 5/2000 | Agashe et al. | | 6,337,668 B1 | 1/2002 | Ito et al. |
| 6,064,678 A | 5/2000 | Sindhushayana et al. | | 6,339,612 B1 | 1/2002 | Stewart et al. |
| 6,069,880 A | 5/2000 | Owen et al. | | 6,353,412 B1 | 3/2002 | Soliman |
| 6,069,883 A | 5/2000 | Ejzak et al. | | 6,353,645 B1 | 3/2002 | Solve et al. |
| 6,070,071 A | 5/2000 | Chavez et al. | | 6,356,538 B1 | 3/2002 | Li |
| 6,075,974 A | 6/2000 | Saints et al. | | 6,356,555 B1 | 3/2002 | Rakib et al. |
| 6,078,572 A | 6/2000 | Tanno et al. | | 6,366,570 B1 | 4/2002 | Bhagalia |
| 6,081,536 A | 6/2000 | Gorsuch et al. | | 6,366,786 B1 | 4/2002 | Norman et al. |
| 6,088,324 A | 7/2000 | Sato | | 6,370,117 B1 | 4/2002 | Koraitim et al. |
| 6,088,335 A | 7/2000 | I et al. | | 6,373,830 B1 | 4/2002 | Ozluturk |
| 6,094,421 A | 7/2000 | Scott | | 6,373,834 B1 | 4/2002 | Lundh et al. |
| 6,094,576 A | 7/2000 | Häkkinen et al. | | 6,377,548 B1 | 4/2002 | Chuah |
| 6,097,707 A | 8/2000 | Hodzic et al. | | 6,377,809 B1 | 4/2002 | Rezaiifar et al. |
| 6,097,733 A | 8/2000 | Basu et al. | | 6,388,997 B1 | 5/2002 | Scott |
| 6,097,972 A | 8/2000 | Saints et al. | | 6,388,999 B1 | 5/2002 | Gorsuch et al. |
| 6,100,843 A | 8/2000 | Proctor, Jr. et al. | | 6,389,000 B1 | 5/2002 | Jou |
| 6,101,176 A | 8/2000 | Honkasalo et al. | | 6,396,804 B2 | 5/2002 | Odenwalder |
| 6,101,179 A | 8/2000 | Soliman | | 6,396,823 B1 | 5/2002 | Park et al. |
| 6,104,708 A | 8/2000 | Bergamo | | 6,414,947 B1 | 7/2002 | Legg et al. |
| 6,111,863 A | 8/2000 | Rostoker et al. | | 6,418,148 B1 | 7/2002 | Kumar et al. |
| 6,112,092 A | 8/2000 | Benveniste | | 6,424,645 B1 | 7/2002 | Kawabata et al. |
| 6,115,370 A | 9/2000 | Struhsaker et al. | | 6,426,960 B2 | 7/2002 | Antonio |
| 6,118,767 A | 9/2000 | Shen et al. | | 6,452,911 B1 | 9/2002 | Seo |
| 6,125,148 A | 9/2000 | Frodigh et al. | | 6,452,913 B1 | 9/2002 | Proctor, Jr. |
| 6,134,233 A | 10/2000 | Kay | | 6,453,176 B1 | 9/2002 | Lopes et al. |
| 6,151,332 A | 11/2000 | Gorsuch et al. | | 6,456,608 B1 | 9/2002 | Lomp |
| 6,157,616 A | 12/2000 | Whitehead | | 6,466,800 B1 | 10/2002 | Sydon et al. |

| | | |
|---|---|---|
| 6,469,991 B1 | 10/2002 | Chuah |
| 6,473,623 B1 | 10/2002 | Benveniste |
| 6,483,816 B2 | 11/2002 | Tsunehara et al. |
| 6,490,461 B1 | 12/2002 | Muller |
| 6,498,785 B1 | 12/2002 | Derryberry et al. |
| 6,498,790 B1 | 12/2002 | Shaheen et al. |
| 6,498,939 B1 | 12/2002 | Thomas |
| 6,501,787 B1 | 12/2002 | Odenwalder et al. |
| 6,504,830 B1 | 1/2003 | Östberg et al. |
| 6,512,751 B1 | 1/2003 | Struhsaker et al. |
| 6,512,931 B1 | 1/2003 | Kim et al. |
| 6,519,452 B1 | 2/2003 | Agostino et al. |
| 6,519,651 B1 | 2/2003 | Dillon |
| 6,522,639 B1 | 2/2003 | Kitade et al. |
| 6,526,039 B1 | 2/2003 | Dahlman et al. |
| 6,526,064 B1 | 2/2003 | Bousquet |
| 6,526,281 B1 | 2/2003 | Gorsuch et al. |
| 6,532,226 B1 | 3/2003 | Lehtinen et al. |
| 6,532,365 B1 | 3/2003 | Anderson et al. |
| 6,535,545 B1 | 3/2003 | Ben-Bassat et al. |
| 6,542,481 B2 | 4/2003 | Foore et al. |
| 6,545,986 B1 | 4/2003 | Stellakis |
| 6,545,994 B2 | 4/2003 | Nelson et al. |
| 6,546,252 B1 | 4/2003 | Jetzek et al. |
| 6,563,808 B1 | 5/2003 | Cox et al. |
| 6,567,389 B1 | 5/2003 | Honkasalo et al. |
| 6,567,391 B1 | 5/2003 | Moon |
| 6,567,416 B1 | 5/2003 | Chuah |
| 6,567,670 B1 | 5/2003 | Petersson |
| 6,570,865 B2 | 5/2003 | Masui et al. |
| 6,571,296 B1 | 5/2003 | Dillon |
| 6,574,211 B2 | 6/2003 | Padovani et al. |
| 6,587,446 B2 | 7/2003 | Sarkar et al. |
| 6,597,913 B2 | 7/2003 | Natarajan |
| 6,611,231 B2 | 8/2003 | Crilly et al. |
| 6,611,514 B1 | 8/2003 | Moulsley |
| 6,621,807 B1 | 9/2003 | Jung et al. |
| 6,621,808 B1 | 9/2003 | Sadri |
| 6,621,809 B1 | 9/2003 | Lee et al. |
| 6,628,945 B1 | 9/2003 | Koorapaty et al. |
| 6,633,554 B1 | 10/2003 | Dalal |
| 6,647,000 B1 | 11/2003 | Persson et al. |
| 6,674,739 B1 | 1/2004 | Lee et al. |
| 6,687,509 B2 | 2/2004 | Schmutz et al. |
| 6,690,652 B1 | 2/2004 | Sadri |
| 6,690,938 B1 | 2/2004 | Chin |
| 6,697,642 B1 | 2/2004 | Thomas |
| 6,707,804 B2 | 3/2004 | Proctor, Jr. |
| 6,707,806 B1 | 3/2004 | Kato |
| 6,717,916 B1 | 4/2004 | Ahn et al. |
| 6,718,180 B1 | 4/2004 | Lundh et al. |
| 6,724,740 B1 | 4/2004 | Choi et al. |
| 6,724,743 B1 | 4/2004 | Pigeonnat |
| 6,731,954 B1 | 5/2004 | Katz |
| 6,735,188 B1 | 5/2004 | Becker et al. |
| 6,760,596 B1 | 7/2004 | Fiorini et al. |
| 6,768,727 B1 | 7/2004 | Sourour et al. |
| 6,775,558 B1 | 8/2004 | Ranta et al. |
| 6,782,277 B1 | 8/2004 | Chen et al. |
| 6,785,247 B1 | 8/2004 | Lee |
| 6,788,661 B1 | 9/2004 | Ylitalo et al. |
| 6,795,416 B1 | 9/2004 | Han et al. |
| 6,804,219 B2 | 10/2004 | Koo et al. |
| 6,807,221 B1 | 10/2004 | Kim et al. |
| 6,826,169 B1 | 11/2004 | Fukumasa et al. |
| 6,831,910 B1 | 12/2004 | Moon et al. |
| 6,842,482 B1 | 1/2005 | Hiramatsu |
| 6,845,089 B1 | 1/2005 | Gu et al. |
| 6,868,075 B1 | 3/2005 | Narvinger et al. |
| 6,925,057 B2 | 8/2005 | Cheng et al. |
| 6,925,068 B1 | 8/2005 | Stanwood et al. |
| 6,931,252 B1 | 8/2005 | Aroudaki |
| 6,934,319 B2 | 8/2005 | Subramanian |
| 6,940,845 B2 | 9/2005 | Benveniste |
| 6,954,444 B2 | 10/2005 | Ji et al. |
| 6,956,840 B1 | 10/2005 | Proctor, Jr. |
| 6,963,540 B2 | 11/2005 | Choi et al. |
| 6,977,910 B1 | 12/2005 | Hosur et al. |
| 6,999,425 B2 | 2/2006 | Cheng et al. |
| 6,999,471 B1 | 2/2006 | Frazer et al. |
| 7,027,420 B2 | 4/2006 | Hamalainen |
| 7,039,029 B2 | 5/2006 | Lee et al. |
| 7,046,717 B2 | 5/2006 | Kanterakis et al. |
| 7,079,507 B2 | 7/2006 | Toskala et al. |
| 7,079,523 B2 | 7/2006 | Nelson, Jr. et al. |
| 7,099,629 B1 | 8/2006 | Bender |
| 7,136,377 B1 | 11/2006 | Tweedly et al. |
| 7,158,504 B2 | 1/2007 | Kadaba et al. |
| 7,218,623 B1 | 5/2007 | Proctor, Jr. |
| 7,221,664 B2 | 5/2007 | Proctor, Jr. |
| 7,224,683 B1 | 5/2007 | Marque-Pucheu et al. |
| 7,236,467 B2 | 6/2007 | Kono |
| 7,266,107 B2 | 9/2007 | Choi et al. |
| 7,340,256 B2 | 3/2008 | Speight |
| 2001/0030990 A1 | 10/2001 | Rouphael et al. |
| 2001/0033558 A1 | 10/2001 | Matsuki |
| 2001/0036200 A1 | 11/2001 | Nelson et al. |
| 2001/0038674 A1 | 11/2001 | Trans |
| 2001/0039191 A1 | 11/2001 | Maierhofer |
| 2002/0009061 A1 | 1/2002 | Willenegger |
| 2002/0012332 A1 | 1/2002 | Tiedemann et al. |
| 2002/0045441 A1 | 4/2002 | Ralston et al. |
| 2002/0080024 A1 | 6/2002 | Nelson et al. |
| 2002/0097700 A1 | 7/2002 | Alastalo |
| 2002/0141478 A1 | 10/2002 | Ozluturk |
| 2003/0060224 A1 | 3/2003 | Nelson et al. |
| 2003/0095517 A1 | 5/2003 | Proctor, Jr. |
| 2003/0123401 A1 | 7/2003 | Dean |
| 2004/0005078 A1 | 1/2004 | Tillotson |
| 2004/0009785 A1 | 1/2004 | Nelson et al. |
| 2004/0047328 A1 | 3/2004 | Proctor et al. |
| 2004/0073803 A1 | 4/2004 | Keramane |
| 2004/0160910 A1 | 8/2004 | Gorsuch et al. |
| 2004/0180696 A1 | 9/2004 | Foore et al. |
| 2005/0208961 A1 | 9/2005 | Willenegger |

FOREIGN PATENT DOCUMENTS

| | | |
|---|---|---|
| EP | 0 526 106 | 2/1993 |
| EP | 0 682 423 | 11/1995 |
| EP | 0 682 426 | 11/1995 |
| EP | 0 719 062 | 6/1996 |
| EP | 0 720 309 | 7/1996 |
| EP | 0 475 698 | 3/1997 |
| EP | 0 760 564 | 3/1997 |
| EP | 0 773 636 | 5/1997 |
| EP | 0 808 074 | 11/1997 |
| EP | 0 907 262 | 4/1999 |
| EP | 0 910 176 | 4/1999 |
| EP | 0 959 851 | 11/1999 |
| EP | 1 018 809 | 12/2000 |
| EP | 1 102 512 | 5/2001 |
| GB | 2 326 524 | 12/1998 |
| JP | 59-050603 | 3/1984 |
| JP | 02-177643 | 7/1990 |
| JP | 03-049324 | 3/1991 |
| JP | 04-284033 | 10/1992 |
| JP | 05-030006 | 2/1993 |
| JP | 07-067164 | 3/1995 |
| JP | 07-095151 | 4/1995 |
| JP | 07-131398 | 5/1995 |
| JP | 07-264098 | 10/1995 |
| JP | 08-065273 | 3/1996 |
| JP | 08-242482 | 9/1996 |
| JP | 09-023203 | 1/1997 |
| JP | 09-46270 | 2/1997 |
| JP | 09-055693 | 2/1997 |
| JP | 2000-013867 | 1/2000 |
| JP | 2000-188597 | 7/2000 |
| TW | 566045 | 12/2003 |
| TW | 200536325 | 11/2005 |
| WO | 93/15573 | 8/1993 |
| WO | 95/08900 | 3/1995 |
| WO | 96/08934 | 3/1996 |
| WO | 96/19050 | 6/1996 |
| WO | 96/37081 | 11/1996 |
| WO | 96/27994 | 12/1996 |
| WO | 97/46041 | 4/1997 |
| WO | 97/23073 | 6/1997 |

| | | |
|---|---|---|
| WO | 97/26726 | 7/1997 |
| WO | 97/32412 | 9/1997 |
| WO | 97/46044 | 12/1997 |
| WO | 98/09455 | 3/1998 |
| WO | 99/14869 | 3/1999 |
| WO | 99/25125 | 5/1999 |
| WO | 99/31811 | 6/1999 |
| WO | 99/49596 | 9/1999 |
| WO | 99/52306 | 10/1999 |
| WO | 99/63382 | 12/1999 |
| WO | 99/63682 | 12/1999 |
| WO | 00/57663 | 9/2000 |
| WO | 00/62449 | 10/2000 |
| WO | 00/72464 | 11/2000 |

OTHER PUBLICATIONS

Azad et al., Multirate Spread Spectrum Direct Sequence CDMA Techniques, 1994, The Institute of Electrical Engineers.
Bell Labs Technical Journal, Lucent Technologies, vol. 2, No. 3, Summer 1997.
Budka et al., Cellular Digital Packet Data Networks, Bell Labs Technical Journal, Summer 1997, pp. 164-181.
Cellular Digital Packet Data, System Specification, Release 1.1, Jan. 19, 1995.
Chelouah, A., et al., "Angular Diversity Based on Beam Switching of Circular Arrays for Hiperlan Terminals," *Electronics Letters*, vol. 36, No. 5, pp. 387-388, (Mar. 2, 2000).
Chih-Lin I et al., IS-95 Enhancements for Multimedia Services, Bell Labs Technical Journal, pp. 60-87, Autumn 1996.
Chih-Lin I et al., Load and Interference Based Demand Assignment (LIDA) for Integrated Services in CDMA Wireless Systems, Nov. 18, 1996, pp. 235-241.
Chih-Lin I et al., Multi-Code CDMA Wireless Personal Communications Networks, Jun. 18, 1005.
Chih-Lin I et al., Performance of Multi-Code CDMA Wireless Personal Communications Networks, Jul. 25, 1995.
Chih-Lin I et al., Variable Spreading Gain CDMA with Adaptive Control for True Packet Switching Wireless.
Chung, Packet Synchronization and Identification for Incremental Redundancy Transmission in FH-CDMA Systems, 1992, IEEE, pp. 292-295.
*Data Service Options for Wideband Spread Spectrum Systems*. TIA/EIA Interim Standard. TIA/EIA/IS-707-A. Apr. 1999.
Data Service Options for Wideband Spread Spectrum Systems: Introduction, PN-3676. 1 (to be published as TIA/EIA/IS-707.1), Mar. 20, 1997 (Content Revision 1).
*Data Services Option Standard for Wideband Spread Spectrum Digital Cellular System*. TIA/EIA/IS-99. TIA/EIA Interim Standard. Jul. 1995.
*Data Services Options Standard for Wideband Spread Spectrum Systems: Packet Data Services. PN-3676.5. (to be published as TIA/EIA/IS-707.5) Ballot Version*, May 30, 1997.
Data Standard, Packet Data Section, PN-3676.5 (to be published as TIA/EIA/IS-DATA.5), Dec. 8, 1996, Version 02 (Content Revision 03).
Draft Text for "*95C" Physical Layer (Revision 4), Part 1, Document #531-981-20814-95C, Part 1 on 3GPP2 website (ftp://ftp.3gpp2.org/tsgc.working/1998/1298_Maui/WG3-TG1/531-98120814-95c,%20part%201.pdf).
Draft Text for "95C" Physical Layer (Revision 4), Part 2, Document #531-981-20814-95C, part 2 on 3GGP2 website (ftp://ftp.3gpp2.org/tsgc/working/1998/1298_Maui/WG3-TG1/531-98120814-95c,%20part%202.pdf, 1998).
Durnan, G.J., et al. "Optimization of Microwave Parabolic Antenna Systems Using Switched Parasitic Feed Structures," URSI National Science Meeting, Boulder, CO, p. 323, (Jan. 4-8, 2000).
Durnan, G.J., et al., "Switched Parasitic Feeds for Parabolic Antenna Angle Diversity," *Microwave and Optical Tech. Letters*, vol. 23, No. 4, pp. 200-2003(Nov. 20, 1999).
Ejzak et al., Lucent Technologies Air Interface Proposal for CDMA High Speed Data Service, Revision 0.1, May 5, 1997.
Ejzak et al., Lucent Technologies Air Interface Proposal for CDMA High Speed Data Service, Apr. 14, 1997.

Ejzak, et al. *Proposal for High Speed Packet Data Service*, Version 0.1. Lucent Technologies, Jan. 16, 1997.
Elhakeem, Congestion Control in Signalling Free Hybrid ATM/CDMA Satellite Network, IEEE, 1995, pp. 783-787.
Giger, A.J., *Low-Angle Microwave Propagation: Physics and Modeling*, Norwood, MA, Artech House, (1991).
Hall et al., Design and Analysis of Turbo Codes on Rayleigh Fading Channels, IEEE Journal on Selected Areas in Communications, vol. 16, No. 2, Feb. 1998, pp. 160-174.
Harrington, R.F., "Reactively Controlled Antenna Arrays," *IEEE APS International Symposium Digest*, Amherst, MA, pp. 62-65, (Oct. 1976).
Harrington, R.F., "Reactively Controlled Directive Arrays," *IEEE Trans. Antennas and Propagation*, vol. AP-26, No. 3, pp. 390-395, (May 1978).
Heine, Gunnar, "The Air-Interface of GSM", in GSM Networks: Protocols, Terminology, and Implementation, (MA: Artech House, Inc.), pp. 89-100 (1999).
High Data Rate (HDR) Solution, Qualcomm, Dec. 1998.
High Data Rate (HDR), cdmaOne optimized for high speed, high capacity data, Wireless Infrastructure, Qualcomm, Sep. 1998.
Hindelang et al., Using Powerful "Turbo" Codes for 14.4 Kbit/s Data Service in GSM or PCS Systems, IEEE Global Communications Conference, Phoenix, Arizona, USA, Nov. 3-8, 1997, vol. II, pp. 649-653.
Honkasalo, Harri. *High Speed Data Air Interface*. 1996.
*Introduction to cdma2000 Spread Spectrum Systems, Release C*. TIA/EIA Interim Standard. TIA/EIA/IS-2000.1-C. May 2002.
James, J.R. et al., "Electrically Short Monopole Antennas with Dielectric or Ferrite Coatings," Proc. IEEE, vol. 125, pp. 793-803, (Sep. 1978).
James, J.R., et al., "Reduction of Antenna Dimensions with Dielectric Loading," *Electronics Letters*, vol. 10, No. 13, pp. 263-265, (May 1974).
Kaiser et al., Multi-Carrier CDMA with Iterative Decoding and Soft-Interference Cancellation, Proceedings of Globecom 1997, vol. 1, pp. 523-529.
King, R.W.P., "The Many Faces of the Insulated Antenna," Proc. IEEE, vol. 64, No. 2, pp. 228-238, (Feb. 1976).
Kingsley, S.P., et al., "Beam Steering and Monopulse Processing of Probe-Fed Dielectric Resonator Antennas," *IEEE Proc.-Radar, Sonar, Navigation*, vol. 146, No. 3, pp. 121-125, (Jun. 1999).
Knight, P., "Low-Frequency Behavior of the Beverage Aerial," *Electronics Letter*, vol. 13, No. 1, pp. 21-22, (Jan. 1977).
Knisely, Douglas, N. Telecommunications Industry Association Subcommittee TR-45.5—*Wideband Spread Spectrum Digital Technologies Standards*, Banff, Alberta. Feb. 24, 1997 (TR45.5/97.02.24)21.
Knisely, Douglas, N. Telecommunications Industry Association Subcommittee TR-45.5-Wideband Spread Spectrum Digital Technologies Standards, Working Group III-Physical Layer. Banff, Alberta. Feb. 24, 1997 (TR45.5/97.02.24)22.
Knisely, Lucent Technologies Air Interface Proposal for CDMA High Speed Data Service, Jan. 16, 1997.
Krzymien et al., Rapid Acquisition Algorithms for Synchronization of Bursty Transmissions in CDMA Microcellular and Personal Wireless Systems, IEEE Journal on Selected Areas in Communications, vol. 14, No. 3, Apr. 1996, pp. 570-579.
Kumar et al, An Access Scheme for High Speed Packet Data Service on IS-95 based CDMA, Feb. 11, 1997.
Lau et al., A Channel-State-Dependent Bandwidth Allocation scheme for Integrated Isochronous and Bursty Media Data in a Cellular Mobile Information System, IEEE, 2000, pp. 524-528.
Lee et al., "A Novel Hybrid CDMA/TDMA Protocol with a Reservation Request Slot for Wireless ATM Networks," IEICE Transactions on Communications, vol. E82-B, No. 7, pp. 1073-7076 (Jul. 25, 1999).
Liu et al., Channel Access and Interference Issues in Multi-Code DS-CDMA Wireless Packet (ATM) Networks, Wireless Networks 2, pp. 173-196, 1996.
Long, S.A., et al., "The Resonant Cylindrical Dielectric Cavity Antenna," *IEEE Trans. Antennas and Propagation*, vol. AP-31, No. 3, pp. 406-412, (May 1983).

Lu, J., et al., "Multi-beam Switched Parasitic Antenna Embedded in Dielectric for Wireless Communications Systems," *Electronics Letters*, vol. 37, No. 14, pp. 871-872, (Jul. 5, 2001).

Lucent Technologies Presentation First Slide Titled, Summary of Multi-Channel Signaling Protocol, Apr. 6, 1997.

Lucent Technologies Presentation First Slide Titled, Why Support Symmetric HSD (Phase 1C), Feb. 21, 1997.

Luzwick, J., et al., "A Reactively Loaded Aperture Antenna Array," *IEEE Trans. Antennas and Propagation*, vol. AP-26, No. 4, pp. 543-547, (Jul. 1978).

McCallister, M.W. et al., "Resonant Hemispherical Dielectric Antenna," *Electronics Letters*, vol. 20, No. 16, pp. 657-659, (Aug. 1984).

MccCllister, M.W., et al., "Rectangular Dielectric Resonator Antenna," *Electronics Letter*, vol. 19, No. 6, pp. 218-219, (Mar. 1983).

Melanchuk et al. *CDPD and Emerging Digital Cellular Systems*, Digest of Papers of COMPCN, Computer Society Conference 1996, Santa Clara, CA, no. CONF. 41, Feb. 25, 1996, pp. 2-8, XP000628458.

Milne, R.M.T., "A Small Adaptive Array Antenna for Mobile Communications," *IEEE APS International Symposium Digest*, pp. 797-800, (1985).

Mobile Station-Base Station Compatibility Standard for Dual-Mode Wideband Spread Spectrum Cellular System, TIA Interim Standard, TIA/EIA/IS-95-A (Addendum to TIA/EIA/IS-95), May 1995.

Mobile Station-Base Station Compatibility Standard for Wideband Spread Spectrum Cellular Systems, TIA/EIA Standard, TIA/EIA-95-B (Upgrade and Revision of TIA/EIA-95-A), Mar. 1999.

Motorola, Version 1.0. *Motorola High Speed Data Air Interface Proposal Comparisions and Recommendations*, Jan. 27, 1997.

*MSC-BS Interface (A-Interface) for Public 800 MHz*. TIA/EIA/IS-634-A. TIA/EIA Interim Standard (Revision of TIA/EIA/IS-634) Jul. 1998.

*MSC-BS Interface for Public 800 MHz*. TIA/EIA/IS-634. TIA/EIA Interim Standard, Dec. 1995.

Network Wireless Systems Offer Business Unit (NWS OBU), Feature Definition Document for Code Division Multiple Access (CDMA) Packet Mode Data Services, FDD-1444, Nov. 26, 1996.

Ott, David TR45.5, CDMA WBSS Technical Standards Meeting Summary. Feb. 24-28, 1997 Banff, Alberta.

Ovesjö Frederik, European Telecommunication Standard, SMG2 UMTS physical Layer Expert Group, "UTRA Physical Layer Descriptions FDD parts" (v0.4, Jun. 25, 1998), pp. 1-41, XP-002141421.

Packet Data Service Option Standard for Wideband Spread Spectrum Systems, TIA/EIA Interim Standard, TIA/EIA/IS-657, Jul. 1996.

*Physical Layer Standard for cdma2000 Spread Spectrum Systems, Release C*. TIA/EIA Interim Standard. TIA/EIA/IS-2000.2C. May 2002.

Preston, S., et al., "Direction Finding Using a Switched Parasitic Antenna Array," *IEEE APS International Symposium Digest*, Montreal, Canada, pp. 1024-1027, (1997).

Preston, S.L., et al., A Multibeam Antenna Using Switched Parasitic and Switched Active Elements for Space-Division Multiple Access Applications, *IEICE Trans. Electron.*, vol. E82-C, No. 7, pp. 1202-1210, (Jul. 1999).

Preston, S.L., et al., "Base-Station Tracking in Mobile Communications using a Switched Parasitic Antenna Array," *IEEE Trans. Antennas and Propagation*, vol. 46, No. 6, pp. 841-844, (Jun. 1998).

Preston, S.L., et al., "Electronic Beam Steering Using Switched Parasitic Patch Elements," *Electronics Letters*, vol. 33, No. 1, pp. 7-8, (Jan. 2, 1997).

Preston, S.L., et al., "Size Reduction of Switched Parasitic Directional Antennas Using Genetic Algorithm Optimization Techniaues," *Asia Pacific Microwave Conference Proceedings*, Yokohama, Japan, pp. 1401-1404, (1998).

Preston, S.L., et al., "Systematic Approach to the Design of Directional Antennas Using Switched Parasitic and Switched Active Elements," *Asia Pacific Microwave Conference Proceedings*, Yokohama, Japan, pp. 531-534, (1998).

Puleston, PPP Protocol Spoofing Control Protocol, Global Village Communication (UK) Ltd., Feb. 1996.

Reed et al., Iterative Multiuser Detection for CDMA with FEC: Near-Single-User Performance, IEEE Transactions on Communications, vol. 46, No. 12, Dec. 1998, pp. 1693-1699.

Ruze, J., "Lateral-Feed Displacement in a Paraboloid," *IEEE Trans. Antennas and Propagation*, vol. 13, pp. 660-665, (1965).

Scott, N.L., et al., "Diversity Gain from a Single-Port Adaptive Antenna Using Switched Parasitic Elements Illustrated with a Wire and Monopole Prototype," *IEEE Trans. Antennas and Propagation*, vol. 47, No. 6, pp. 1066-1070, (Jun. 1999).

Shacham, et al., "A Selective-Repeat-ARQ Protocol for Parallel Channels and Its Resequencing Analysis," IEEE Transactions on Communications, XP000297814, 40 (4): 773-782 (Apr. 1997).

Sibille, A., et al., "Circular Switched Monopole Arrays for beam Steering Wireless Communications," *Electronics Letters*, vol. 33, No. 7, pp. 551-552, (Mar. 1997).

Simpson, W. (Editor). "RFC 1661—The Point-to-Point Protocol (PPP)." Network Working Group, Jul. 1994, pp. 1-35. http://www.faqs.org/rfcs/rfc1661.html.

Simpson, W. (Editor). "RFC 1662—PPP in HDLC-Like Framing." Network Working Group, Jul. 1994, pp. 1-17. http://www.faqs.org/rfcs/rfc1662.html.

Skinner et al., Performance of Reverse-Link Packet Transmission in Mobile Cellular CDMA Networks, IEEE, 2001, pp. 1019-1023.

Stage 1 Service Description for Data Services—High Speed Data Services (Version 0.10) CDG RF 38. Dec. 3, 1996.

*Support for 14.4 kbps Data Rate and PCS Interaction for Wideband Spread Spectrum Cellular Systems*. TSB74, Dec. 1995. TIA/EIA Telecommunications Systems Bulletin.

*Telecommunications Industry Association Meeting Summary*. Task Group I, Working Group III, Subcommittee TR45.5. Feb. 24-27, 1997. Banff, Alberta.

*Telecommunications Industry Association Meeting Summary*. Task Group I, Working Group III, Subcommittee TR45.5. Jan. 6-8, 1997. Newport Beach, California.

Third Generation Partnership Project 2, "cdma2000 High Rate Packet Data Air Interference Specification," 3GPP2 C.S0024 Version 2.0 (Oct. 27, 2000).

Third Generation Partnership Project 2, "Physical Layer Standard for cdma2000 Spread Spectrum Systems," 3GPP2 C.0002-0 Version 1.0 (Jul. 1999).

Third Generation Partnership Project, "3rd Generation Partnership Project (3GPP); Technical Specification Group (TSG) RAN WG4; Requirements for Support of Radio Resource Management (FDD)," 3G TS 25.133 V3.0.0 (Dec. 1999).

Third Generation Partnership Project, "Technical Specification Group Radio Access Network; UE Procedures in Idle Mode and Procedures for Cell Reselection in Connected Mode (3G TS 25.304 version 3.1.0)," 3G TS 25.304 V3.1.0 (Dec. 1999).

Third Generation Partnership Project, "Technical Specification Group Radio Access Network; Physical channels and mapping of transport channels onto physical channels (FDD) (Release 1999)," 3GPP TS 25.211 V3.5.0 (Dec. 2000).

Third Generation Partnership Project, "Technical Specification Group Radio Access Network; Multiplexing and channel coding (FDD) (Release 1999)," 3GPP TS 25.212 V3.5.0 (Dec. 2000).

Third Generation Partnership Project, "Technical Specification Group (TSG) RAN WG4 UE Radio transmission and Reception (FDD)," TS 25.101 V3.1.0 (Dec. 1999).

Third Generation Partnership Project, "Technical Specification Group Radio Access Network; Physical layer—General description (3G TS 25.201 version 3.0.0)," 3G TS 25.201 V3.0.0 (Oct. 1999).

Third Generation Partnership Project, "Technical Specification Group Radio Access Network; Physical layer—General description (Release 1999)," 3G TS 25.201 V3.1.0 (Jun. 2000).

Third Generation Partnership Project, "Technical Specification Group Radio Access Networks; Requirements for Support of Radio Resource Management (FDD) (Release 1999)," 3GPP TS 25.133 V3.4.0 (Dec. 2000).

Third Generation Partnership Project, "Technical Specification Group Radio Access Network; UE Procedures in Idle Mode and Procedures for Cell Reselection in Connected Mode (Release 1999)," 3GPP TS 25.304 V3.5.0 (Dec. 2000).

Third Generation Partnership Project, "Technical Specification Group Radio Access Network; Physical channels and mapping of transport channels onto physical channels (FDD) (3G TS 25.211 version 3.1.0)," 3G TS 25.211 V3.1.1 (Sep. 1999).

Third Generation Partnership Project, "Technical Specification Group Radio Access Networks; UE Radio Transmission and Reception (FDD) (Release 1999)," 3GPP TS 25.101 V3.5.0 (Dec. 2000).

Third Generation Partnership Project, "Technical Specification Group Group Radio Access Network; Multiplexing and channel coding (FDD) (3G TS 25.212 version 3.1.0)," 3G TS 25.212 V3.1.1 (Dec. 1999).

Third Generation Partnership Project, "Technical Specification Group Radio Access Network; Physical Layer Procedures (FDD) (Release 1999)." 3GPP TS 25.214 v3.1.0 (Dec. 1999).

Third Generation Partnership Project, "Technical Specification Group Radio Access Network; Physical Layer Procedures (FDD) (Release 1999)." 3GPP TS 25.214 v3.5.0 (Dec. 2000).

Third Generation Partnership Project, "Technical Specification Group Radio Access Network; Physical layer procedures (TDD) (Release 1999)," 3GPP TS 25.224 V3.1.0 (Dec. 1999).

Third Generation Partnership Project, "Technical Specification Group Radio Access Network; Physical layer procedures (TDD) (Release 1999)," 3GPP TS 25.224 V3.5.0 (Dec. 2000).

Third Generation Partnership Project, "Technical Specification Group Radio Access Network; Spreading and modulation (TDD) (Release 1999)," 3GPP TS 25.223 V3.1.0 (Dec. 1999).

Third Generation Partnership Project, "Technical Specification Group Radio Access Network; Spreading and modulation (TDD) (Release 1999)," 3GPP TS 25.223 V3.4.0 (Sep. 2000).

Third Generation Partnership Project, "Technical Specification Group Radio Access Network; Radio Resource Management Strategies (3G TR 25.922 version 3.0.0)," 3G TR 25.922 V3.0.0 (Dec. 1999).

Third Generation Partnership Project, "Technical Specification Group Radio Access Network; Radio Resource Management Strategies (Release 1999)," 3G TR 25.922 V3.4.0 (Dec. 2000).

Third Generation Partnership Project, "Technical Specification Group Radio Access Network; MAC protocol specification (3G TS 25.321 version 3.2.0)," 3G TS 25.321 V3.2.0 (Dec. 1999).

Third Generation Partnership Project, "Technical Specification Group Radio Access Network; MAC protocol specification (Release 1999)," 3G TS 25.321 V3.6.0 (Dec. 2000).

Third Generation Partnership Project, "Technical Specification Group Radio Access Network; Services provided by the physical layer (Release 1999)," 3GPP TS 25.302 V3.7.0 (Dec. 2000).

Third Generation Partnership Project, "Technical Specification Group Radio Access Network; Services provided by the physical layer (Release 1999)," 3GPP TS 25.302 V3.2.0 (Dec. 1999).

Third Generation Partnership Project, "Technical Specification Group Radio Access Network; Physical channels and mapping of transport channels onto physical channels (TDD) (3G TS 25.221 version 3.1.0)," (3G TS 25.221 V3.1.0 (Dec. 1999).

Third Generation Partnership Project, "Technical Specification Group Radio Access Network; Physical channels and mapping of transport channels onto physical channels (TDD) (Release 1999)," 3G TS 25.221 V3.5.0 (Dec. 2000).

Third Generation Partnership Project, "Technical Specification Group Radio Access Network; RRC Protocol Specification (3G TS 25.331 version 3.1.0 Release 1999)," 3G TS 25.331 V3.1.0 (Jan. 2000).

Third Generation Partnership Project, "Technical Specification Group Radio Access Network; RRC Protocol Specification (Release 1999)," 3GPP TS 25.331 V3.5.0 (Dec. 2000).

Third Generation Partnership Project, "Technical Specification Group Radio Access Network, Synchronisation in UTRAN Stage 2 (Release 1999)," 3GPP TS 25.402 V3.4.0 (Dec. 2000).

Third Generation Partnership Project, "Technical Specification Group Radio Access Network, Synchronisation in UTRAN Stage 2 (3G TS 25.402 version 3.0.0 Release 1999)," 3GPP TS 25.402 V3.4.0 (Dec. 2000).

TIA/EIA Interim Standard, Mobile Station-Base Station Compatibility Standard for Dual-Mode Wideband Spread Spectrum Cellular System, TIA/EIA/IS-95 (Jul. 1993).

Tsui et al., "Sensitivity of EW Receivers," Microwave Journal, vol. 25, pp. 115-117, 120 (Nov. 1982).

*Upper Layer (Layer 3) Signaling Standard for cdma2000 Spread Spectrum Systems, Release C.* TIA/EIA Interim Standard. TIA/EIA/IS-2000.5-C. May 2002.

Vaughn, R., "Switched Parasitic Elements for Antenna Diversity," *IEEE Trans. Antennas and Propagation*, vol. 47, No. 2, pp. 399-405, (Feb. 1999).

Viterbi, The Path to Next Generation Services with CDMA, Qualcomm Incorporated, 1998 CDMA Americas Congress, Los Angeles, California, Nov. 19, 1998.

Wang et al., The Performance of Turbo-Codes in Asynchronous DS-CDMA, IEEE Global Communications Conference, Phoenix, Arizona, USA, Nov. 3-8, 1007, Gol. III, pp. 1548-1551.

www.cdg.org/news/press/1997.asp. CDA Press Release Archive, 1997.

Yang, Samuel C., "Principles of Code Division Multiple Access," in CDMA RF System Engineering, (MA: Artech House, Inc.), 1998, Chapter 4, pp. 75-103.

\* cited by examiner

| MODE | SYCHRONIZATION CHANNELS | TIMING REFERENCE IN REVERSE LINK | ASSIGNMNET OF TRAFFIC CHANNELS FOR DATA TRANSMISSIONS |
|---|---|---|---|
| ACTIVE | LQM + TRAFFIC | PILOT SYMBOL SEQUENCE | YES |
| STANDBY | LQM + HEART BEAT | SHORT PN CODES | NO |
| IDLE | NONE | NONE | NO |

FIG. 7

MINIMAL MAINTENANCE LINK TO SUPPORT SYCHRONIZATION

CROSS REFERENCE TO RELATED APPLICATIONS

This application is a continuation of U.S. patent application Ser. No. 09/778,474 filed Feb. 7, 2001, which claims the benefit of U.S. Provisional Application Ser. No. 60/180,598 filed on Feb. 7, 2000, the contents of which are hereby incorporated by reference herein.

BACKGROUND OF THE INVENTION

Increasing use of wireless telephones and personal computers has led to a corresponding increase in demand for advanced telecommunication services that were once thought practical only for specialized applications. In the 1980s, wireless voice communication became widely available through cellular telephone networks. Such services were thought at first to be the exclusive province of the businessman because of expected high subscriber costs. The same was also true for access to remotely distributed computer networks, whereby until very recently, only business people and large institutions could afford the necessary computers and wireline access equipment.

As a result of the widespread availability of affordable new technologies, the general population now increasingly desires to have not only wireline access to networks such as the Internet and private intranets, but also wireless access as well. Wireless technology is particularly useful to users of portable computers, laptop computers, hand-held personal digital assistants and the like who prefer access to such networks without being tethered to a telephone line.

There still is no widely available satisfactory solution for providing low cost, high speed access to the Internet, private intranets, and other networks using the existing wireless infrastructure. This is most likely an artifact of several unfortunate circumstances. For one, the typical manner of providing high speed data service in the business environment over a wireline network is not readily adaptable to the voice grade service available in most homes or offices. Such standard high speed data services also do not lend themselves well to efficient transmission over standard cellular wireless handsets because wireless networks were originally designed only to provide voice services. As a result, present day digital wireless communication systems are optimized for voice transmissions, although certain schemes such as CDMA do provide some measure of asymmetrical behavior for the accommodation of data transmission. For example, the data rate specified by the Telecommunication Industry Association (TIA) for IS-95 on the forward traffic channel is adjustable in increments from 1.2 kbps up to 9.6 kbps for so-called Rate Set 1, and increments from 1.8 kbps up to 14.4 kbps for Rate Set 2. On the reverse link traffic channel, however, the data rate is fixed at 4.8 kbps.

Existing wireless systems therefore typically provide a radio channel that can accommodate maximum data rates only in the range of 14.4 kilobits per second (kbps) at best in the forward direction. Such a low data rate channel does not lend itself directly to transmitting data at rates of 28.8 or even 56.6 kbps that are now commonly available using inexpensive wireline modems, not to mention even higher rates such as the 128 kbps that are available with Integrated Services Digital Network (ISDN) type equipment. Data rates at these levels are rapidly becoming the minimum acceptable rates for activities such as browsing web pages.

Although wireline networks were known at the time when cellular systems were initially developed, for the most part, there was no provision made for such wireless systems to provide higher speed ISDN- or xDSL-grade data services over cellular network topologies.

In most wireless systems, there are many more potential users than radio channel resources. Some type of demand based multiple access is therefore required.

Whether the multiple access is provided by the traditional Frequency Division Multiple Access (FDMA) using analog modulation on a group of radio frequency carrier signals, or by schemes that permit sharing of a radio carrier frequency using Time Division Multiple Access (TDMA), or Code Division Multiple Access (CDMA), the nature of the radio spectrum is such that it is a medium that is expected to be shared. This is quite dissimilar to the traditional environment for data transmission, in which the wireline medium is relatively inexpensive to obtain and is not typically intended to be shared.

Other factors to consider in the design of a wireless system are the characteristics of the data itself. For example, consider that access to web pages in general is burst-oriented, with asymmetrical data rate transmission requirements in a reverse and forward direction. Typically, the user of a remote client computer first specifies the address of a web page to a browser program. The browser program then sends this web page address data, which is usually 100 bytes or less in length, over the network to a server computer. The server computer then responds with the content of the requested web page, which may include anywhere from 10 kilobytes to several megabytes of text, image, audio, or even video data. The user thereafter may spend several seconds or even several minutes reading the content of the page before downloading another web page.

In an office environment, the nature of most employees' computer work habits is typically to check a few web pages and then to do something else for an extended period of time, such as accessing locally stored data or even terminating use of the computer altogether. Therefore, even though such users may remain connected to the Internet or private intranet continuously during an entire day, actual use of the high speed data link usually quite sporadic.

If wireless data transfer services supporting Internet connectivity are to coexist with wireless voice communication, it is becoming increasingly important to optimize the use of available resources in wireless CDMA systems. Frequency re-use and dynamic traffic channel allocation address some aspects of increasing the efficiency of high performance wireless CDMA communication systems, but there is still a need for more efficient utilization of available resources.

SUMMARY OF THE INVENTION

The present invention provides several novel features for optimizing wireless links in a CDMA communication system. In general, a coded channel is dedicated for carrying adjustment messages to maintain synchronization of links between a base station and each of multiple field units. Accordingly, the system is capable of supporting higher throughput data transfers due to reduced co-channel interference.

In an illustrative embodiment, a first forward link channel is allocated to support message transmissions from a base station to each of multiple field units. A second reverse link channel is allocated to support message transmissions from the field units back to the base station. Each channel is partitioned into time slots, where a time slot in the first channel is assigned to a field unit for directing communications from the base station to the corresponding field unit. Likewise, a time slot in the second channel is assigned for use by a field unit to transmit messages to the base station. Based on the assignment, the time slot itself indicates to which field unit a message is directed. Timing alignment of the first and second channels is achieved by adjusting respective timing of one channel based upon message transmissions indicating how to achieve synchronization.

Preferably, the first channel is partitioned to include both "active" and "standby" time slots, where an active time slot corresponds to a field unit transmitting a data payload such as digital web page information to the base station on the reverse link.

The base station monitors the field units, acknowledging requests by corresponding field units to be placed in the active mode. If available, an active time slot is assigned to the link requesting field unit and traffic channels are allocated in the reverse link to support a data payload transfer between the requesting field unit and the base station. Following a data transfer on a particular link, the field unit is reassigned to a standby time slot for maintaining a minimal but synchronized link with the base station.

In a preferred embodiment, there are a predetermined number of periodically repeating time slots allocated within each of the first and second channels. Hence, messages from the base station or field units are transmitted on a periodic basis in the appropriate time slots. Preferably, a time slot assigned to a field unit in the first channel for receiving data from the base station is offset in time with respect to the time slot assigned in the second channel for transmitting data from the field unit to the base station.

Messages received at the base station in assigned time slots from each of many field units are analyzed to determine how to adjust the timing of future message transmissions at the corresponding field units. In particular, timing alignment of a field unit is adjusted so that a message is received at the base station in the assigned time slot. This is achieved by transmitting a timing adjustment message from the base station over the forward link to the field unit indicating whether the field unit should advance or retard timing of future message transmissions. In this way, field units transmitting messages in adjacent time slots of the same reverse link channel typically will not interfere with each other.

Messages transmitted over a reverse link channel from a field unit to the base station preferably include markers that are monitored at the base station for synchronizing the corresponding field unit with the base station. The marker transmitted in a message provides a reference point within a time slot for generating timing correction information as described above. Preferably, a well-placed string of pilot symbols is used as a time reference marker in a time slot. Alternatively, a short pseudorandom noise (PN) code may be used as a marker in a time slot.

While in the active mode, a marker in a corresponding time slot of the traffic channels is analyzed to support timing alignment between the field unit and base station. While in the inactive or standby mode, a marker in a time slot of the second channel is analyzed to support timing alignment between the field unit and base station.

In a more specific application, the message sent from the base station to a field unit is a single bit indicating whether to advance or retard timing reference at the field unit. Based on the state of the bit received at a corresponding field unit, the field unit then advances or retards its timing a predefined amount of time such as 1/8 of a chip. If a state of the single bit is in a same state n times in a row, i.e., n logic ones or zeros are received in a row, a subsequent bit in the same state will cause the field unit to advance or retard its timing based on a larger predefined time such as 1/2 of a chip rather than 1/8 of a chip.

The base station monitors an access channel for requests by field units to establish new links with the base station. The time a link request message is received at the base station is used to determine an initial timing adjustment to be made by the requesting field unit for achieving timing synchronization with the base station.

More particularly, to achieve initial synchronization of time slots between the base station and field unit, a coarse timing adjustment message is transmitted to a respective field unit indicating how to achieve timing alignment with the base station. The coarse timing adjustment message is preferably a multi-bit value notifying the field unit of an amount to advance or retard its initial timing to achieve synchronization with the base station. Accordingly, this provides the field unit with a slot timing reference for receiving and transmitting messages in assigned time slots.

Preferably, the coarse timing adjustment message is sent to the link requesting field unit over a paging channel. Likewise, time slot assignment information is transmitted to a field unit over the paging channel.

A set of short PN codes are optionally assigned to a field unit, where each code corresponds to a predefined command or request. One of the codes is transmitted in an assigned time slot on the second channel from a field unit to communicate a message to the base station. In one instance, an assigned short PN code indicates a request by the field unit to transmit a data payload from the field unit to the base station. Another short PN code is used to notify the base station that a field unit desires to remain in the standby mode. In a preferred embodiment, the short PN code is also used as a marker within a time slot to synchronize the first and second channel as mentioned above.

One other aspect of the present invention is to provide a link between a base station and each of multiple field units using minimal resources. Providing shared channels using the methods as described above for communicating with a base station reduces the number of CDMA channels necessary to maintain synchronized links with multiple field units. Accordingly, more channels are then available to support data transfers between the base station and field units. This increases the potential throughput on an allocated carrier frequency since more CDMA channels are available to support data payload transfers.

Another aspect of the present invention is the recited method for supporting timing alignment between the base station and each of multiple field units. The base station analyzes a time marker incorporated in each message received in an assigned time slot to detect whether a field unit message directed to the base station is early or late with respect to a preferred time of receipt at the base station. Accordingly, a message such as a single advance/retard control bit is transmitted back to the corresponding field unit to advance or retard its timing so that future message transmissions from the field unit are received at the base station in the appropriate time slot. Thus, multiple field units transmitting messages on the shared reverse link channel generally do not collide with each other. Additionally, the timing information sent on the forward link enables the field unit to synchronize itself to the base station for receiving messages in its assigned time slot on the forward link.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

FIG. 7 is a table showing attributes of the active, standby and idle mode according to the principles of the present invention.

DETAILED DESCRIPTION OF A PREFERRED EMBODIMENT

Figure 1:
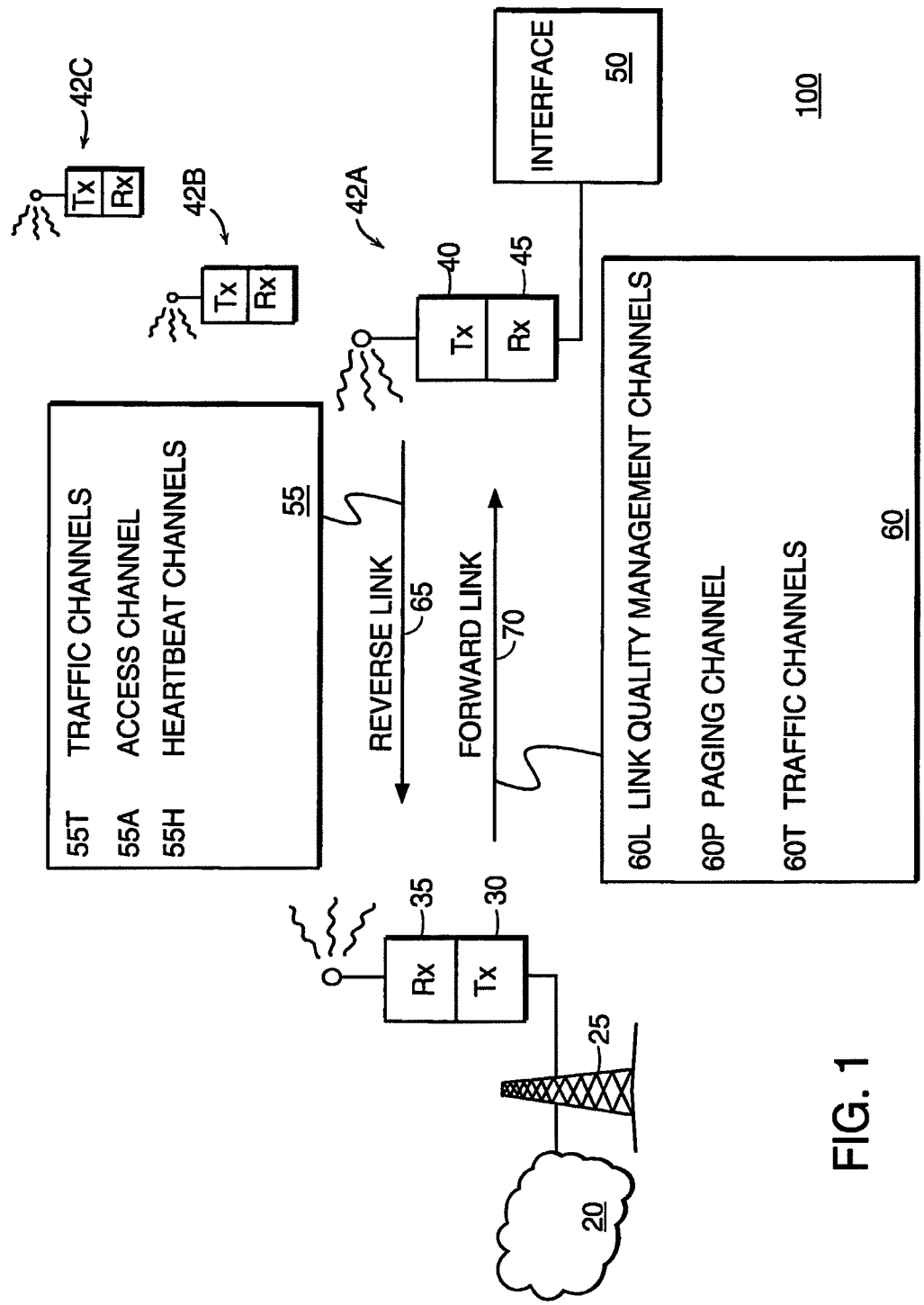
FIG. 1 is a general diagram illustrating a wireless communication system according to the principles of the present invention.

FIG. 1 is a diagram of a wireless communication system 100 according to the principles of the present invention. A base station 25 maintains wireless communication links with a plurality of field units 42A, 42B, 42C (collectively, field units 42) as shown. Such wireless links are established based upon assignment of resources on a forward link 70 and a reverse link 65 between the base station 25 and field units 42. Each link 65 or 70 is typically made up of several logical channels 55 or 60.

System 100 supports wireless communications between interface 50 and network 20. Network 20 is typically a Public Switched Telephone Network (PSTN) or computer network such as the Internet. Interface 50 is preferably coupled to a digital processing device such as a portable computer (not shown), to provide wireless access to network 20.

In an illustrative embodiment, the forward link channels 60 and reverse link channels 55 are defined in the wireless communication system 100 as Code Division Multiple Access (CDMA) channels. That is, each CDMA channel is preferably defined by encoding data to be transmitted over the channel with an augmented pseudorandom noise (PN) code sequence. The PN coded data is then modulated onto a radio frequency carrier. This enables a receiver to decipher one CDMA channel from another knowing only the particular augmented PN code assigned to that channel. In accordance with the preferred embodiment, each channel preferably occupies a 1.25 MHz band consistent with the IS-95 CDMA standard and is capable of transmitting data at 38.4 kbps.

The forward link channels 60 include at least three logical channels. Included among these are a Link Quality Management (LQM) channel 60L, a paging channel 60P, and multiple traffic channels 60T.

The reverse link 65 includes a heartbeat channel 55H, an access channel 55A and multiple traffic channels 55T. Generally, the reverse link channels 55 are similar to the forward link channels 60 except that each reverse link traffic channel 60T may support variable data rates from 2.4 kbps to a maximum of 160 kbps.

Data transmitted between base station 25 and a field unit 42 typically consists of encoded digital information, such as Web page data. Based on the allocation of traffic channels in the reverse link 65 or forward link 70, data transfer rates are generally limited by the number of available traffic channels 55T.

Figure 2:
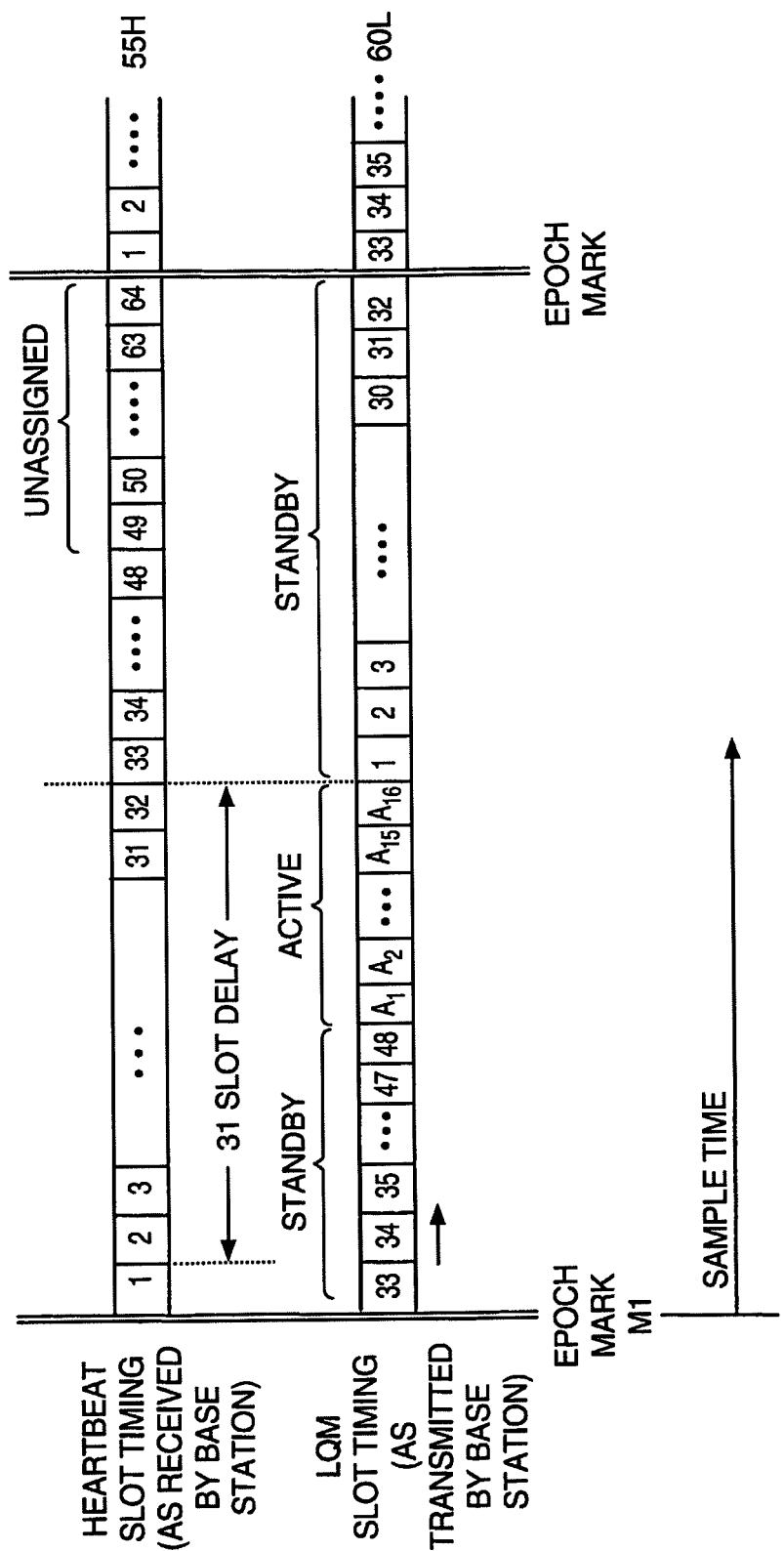
FIG. 2 is a timing diagram illustrating heartbeat slot and link quality management (LQM) slot timing according to the principles of the present invention.

As shown in FIG. 2, the forward link LQM channel 60L is partitioned into a predetermined number of periodically repeating time slots for the transmission of messages to each of multiple field units 42. Each field unit 42A identifies messages directed to itself based upon messages received in an assigned time slot.

The reverse link heartbeat channel 55H is shared among multiple users. For example, the heartbeat channel 55H is also partitioned into periodically repeating time slots. Each time slot is assigned to one of many field units 42 for transmitting heartbeat messages to the base station 25. Accordingly, the base station 25 identifies from which field unit 42A a message is transmitted based upon the receipt of a message in a particular time slot. The heartbeat channel 55H and the LQM channel 60L are described in more detail below.

In the following description, reference is again generally made to FIG. 1, but more specific details of LQM channel 60 and heartbeat channel 55H are referenced to FIG. 2.

To establish a synchronized link with the base station 25, field units 42 transmit link request messages on the access channel 55A to base station receiver 35 via field unit transmitter 40. Messages are then acknowledged and processed at the base station 25. If available, resources are then allocated at the base station 25 to establish a bidirectional communication link with the requesting field unit 42A.

Within the forward link 70, the paging channel 60P is used by the base station transmitter 30 to send overhead and paging messages or commands to the field unit receiver 45. Overhead information includes data such as system configuration parameters for establishing wireless links with field units 42.

As mentioned previously, wireless communication system 100 includes a heartbeat channel 55H in the reverse link 65 and link quality management channel (LQM) 60L in the forward link 70. These channels are shared between the base station 25 and multiple field units 42. That is, the base station 25 transmits messages to multiple field units 42 using the same forward link LQM channel 60L, where a message to a particular field unit 42A is transmitted in an assigned time slot. In this way, time slot assignments serve as a way of addressing messages to a particular field unit and corresponding communication link.

The principles of the present invention are advantageously deployed to support users that require on-demand, sporadic high speed throughput of data on a wireless communication link. For example, remote users connected to the Internet over a wireless link typically require high speed throughput when downloading an object file such as a Web page. Such users then typically do not require any data transfer for a period of time. To support such users, it is advantageous to maintain synchronization with the base station for future on-demand data transfers. This is achieved in the wireless communication system 100 by maintaining a minimal connection with the base station 25 even when no data is being actively transferred between the base station 25 and a specific field unit 42.

Repeatedly creating or reviving connections for users who sporadically need a link can be time consuming and an inefficient use of resources. It is also inefficient to reserve resources such as traffic channels 55T for subscribers who are not transmitting data. Accordingly, traffic channels 55T are allocated on an as-needed basis to support data transfers, optimizing the use of available resources in wireless communication system 100.

FIG. 2 is a timing diagram for the heartbeat channel 55H and LQM channel 60L. Preferably, there are two LQM channels 60L and two heartbeat channels 55H since channels are typically allocated in pairs. However, only one of each channel type is shown in FIG. 2 for illustrative purposes.

As shown, 64 time slots (in each direction) are defined per EPOCH period in each of the heartbeat 55H and LQM 60L channels. The EPOCH period in the illustrated embodiment is 13.3 mS, so that each time slot is 208 mS or 256 PN code chips. Because time slots repeat on a periodic basis, base station 25 exchanges information with a particular field unit 42A every EPOCH or 13.3 mS.

Data transmissions on the LQM channel 60L are maintained by the base station 25, which is preferably used as a master timing reference. That is, timing of the field units 42 is aligned with base station 25. Field units 42, therefore, must synchronize themselves to the base station 25, and specifically to the LQM channel 60L, in order to maintain synchronization with the base station 25.

Generally, a link between the base station 25 and a field unit 42A is maintained in one of three modes: active, standby or idle. Synchronization between base station 25 and a particular field unit 42A is maintained only for the active and standby mode. FIG. 7 provides more details about mode types maintained for a particular link between the base station 25 and a field unit 42A.

Each field unit 42A in the standby mode is assigned one time slot in the forward link LQM channel 60L and one time slot in the reverse link heartbeat channels 55H. Accordingly, information is targeted to a receiving field unit 42A (subscriber) based upon the transmission of a message in a particular time slot. For example, a field unit 42A assigned to time slot #1 decodes information received in time slot #1 on the forward link LQM channel 60L, while data is transmitted back to the base station 25 from field unit 42A in time slot #1 of the reverse link heartbeat channel 55H. Both base station 25 and field unit 42A identify to which link a message pertains based on receipt of a message in a particular time slot.

Preferably, there is a timing offset between time slots in each respective channel allowing base station 25 time to process a message received in an assigned time slot and then respond accordingly over the LQM channel 60L in a following cycle. It should be noted that although the LQM channel 60L is used as the time reference as described above, the principles of the present invention equally apply where the heartbeat channel 55H is alternatively used as a master timing reference rather than the LQM channel 60L. In other words, base station 25 is optionally synchronized with respect to a field unit 42A.

In the standby mode, synchronization is maintained between the forward link LQM channel 60L and reverse link heartbeat channel 55H based upon messages sent in the appropriate time slot on the LQM channel 60L indicating to a particular field unit 42A whether messages transmitted to the base station 25 from that field unit are received in the appropriate time slot. Message transmissions from the field unit transmitter 40 to base station 25 on the heartbeat channel 55H are analyzed at base station receiver 35 to achieve fine tuning alignment between base station 25 and each of multiple field units 42.

As shown in FIG. 2, time slots A.sub.1 through A.sub.16 of the LQM channel 60L are reserved for field units 42 in the active mode, indicating that data is being transferred between the field unit 42A and the base station 25. Contrariwise, time slots numbered 1-48 are reserved for field units 42 operating in the standby mode on the LQM channels 60L.

At any given time, there are typically no more than 48 time slots in the heartbeat channel 55H or LQM channel 60L assigned to respective field units 42. This ensures that on completion of a data transfer between a field unit 42A and base station 25, a field unit 42A in the active mode assigned an active time slot can revert back to the standby mode and consequently be assigned an unused standby mode time slot 1-48 in the LQM channel 60L again.

Preferably, field units 42 in the standby mode are assigned an unused active time slot as close to the EPOCH mark M1 as possible when they are placed in the active mode. For example, if 48 field units are assigned standby mode LQM slots 1-48, a field unit 42A set to the active mode would be assigned active mode time slot A1 in the LQM channel. The next active time slot to be assigned to a field unit 42A would be the lowest numbered and unused time slot such as A2, assuming A1 is then in use.

Figure 3:
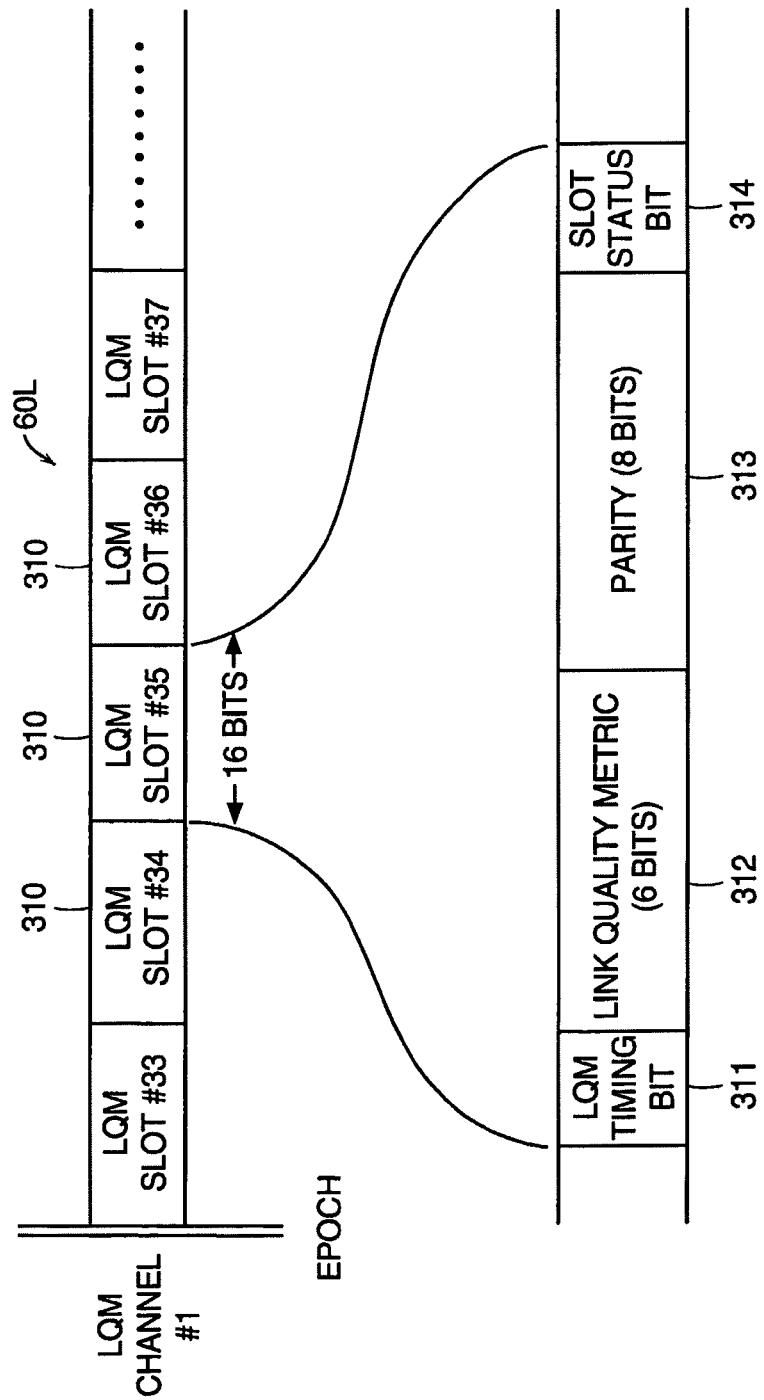
FIG. 3 is a diagram illustrating the bit definition of an LQM slot according to the principles of the present invention.

FIG. 3 is a timing diagram illustrating the mapping of bits in a forward link LQM time slot 310. As shown, there are 16 bits transmitted in each time slot 310. The adjustment message transmitted in time slot 310 indicates whether the corresponding field unit message transmission received at the base station 25 on a last message cycle is accurately received within the assigned time slot at base station 25. This feedback loop ensures that other field units 42 transmitting messages in adjacent time slots of the same reverse link heartbeat channel 55H do not interfere with each other.

In a preferred embodiment, the LQM timing bit 311 indicates whether a field unit 42A is to advance or retard its timing on the reverse link 65. A logic one indicates that timing should be advanced ⅛ of a chip while a logic zero indicates that timing should be retarded ⅛ of a chip. In this way, the base station 25 individually synchronizes time slots and, therefore, communication links between the base station 25 and each of a plurality of field units 42. Said differently, timing of message transmissions from corresponding field units 42 are adjusted so that corresponding messages are received in the assigned time slots at the base station 25.

In a preferred embodiment, the base station 25 transmits information on the LQM channel 60L based on BCH coding. This enables a receiving unit to detect and correct errors. For example, the use of a 15,7 code allows up to 2 errors to be corrected and up to 3 errors to be detected. As shown in FIG. 3, there are 8 parity bits 313 for error correction and detection.

Figure 4:
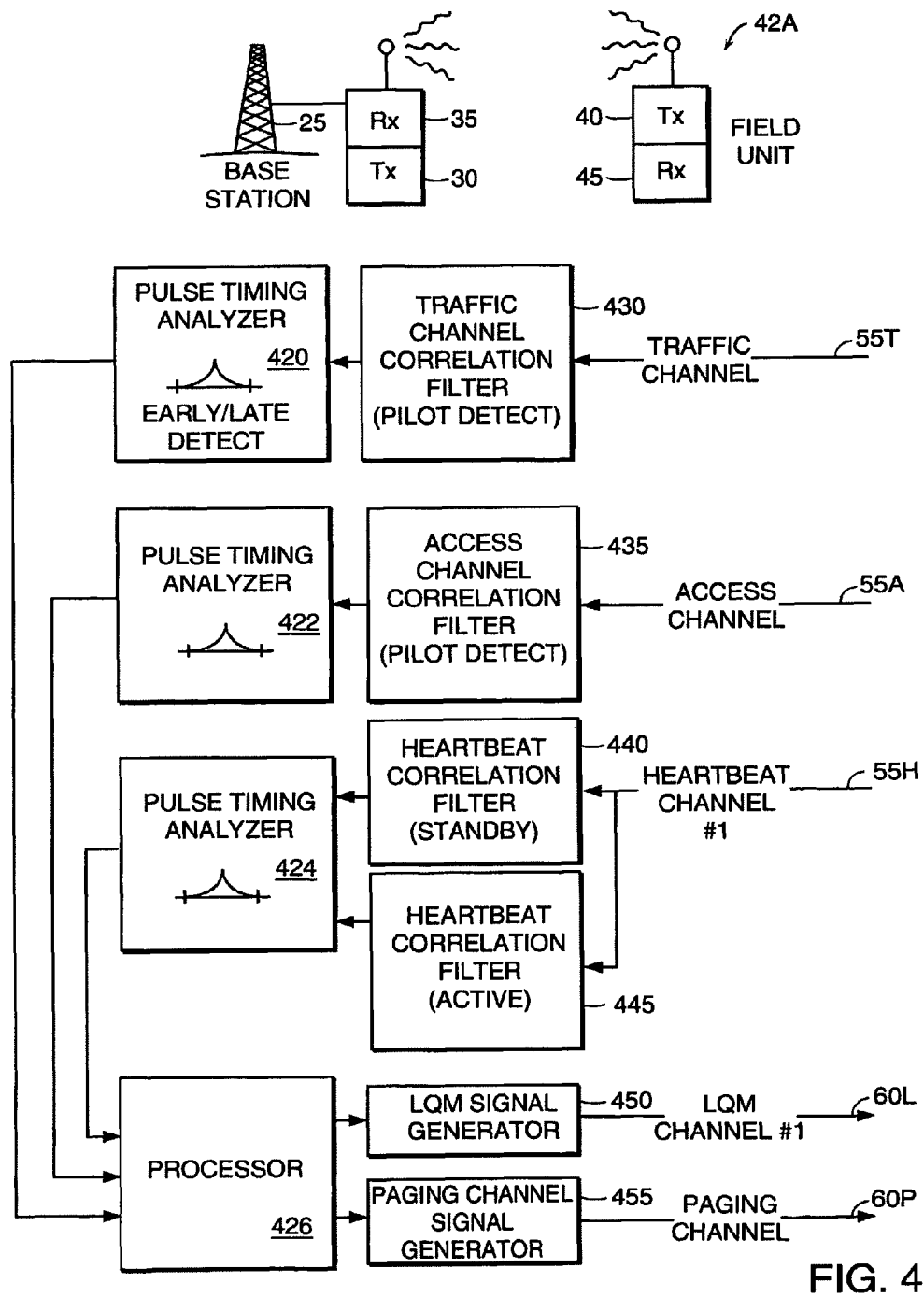
FIG. 4 is a block diagram of components supporting channel synchronization according to the principles of the present invention.

FIG. 4 more particularly shows hardware at base station 25 that is used to achieve synchronization of the reverse link 65 and forward link 70. As discussed, synchronization is achieved between a field unit 42A and base station 25 based on the forward link LQM channel 60L and reverse link heartbeat channel 55H.

It should be noted that each field unit 42A is assigned a set of short PN codes, one of which is generally to be transmitted in the assigned time slot in the reverse link heartbeat channel 55H. Each code corresponds to a particular command or request and is transmitted by a field unit 42A to the base station 25. For example, one code is used to notify the base station that the field unit 42A needs to transmit a data payload to the base station, i.e., a field unit requests to go active.

Time slots assigned to each field unit 42A on the heartbeat channel 55H are analyzed by heartbeat correlation filters 440, 445. Basically, the short PN codes received in a particular time slot are monitored to detect a request by the corresponding field unit 42A to be placed in the active mode. Thereafter, the base station 25 will set the field unit 42A to the active mode by assigning it the appropriate resources to transmit a data payload in the reverse link direction to base station 25. Note that a first heartbeat correlation filter 440 detects a short PN code corresponding with a request to remain in the standby mode, while a second heartbeat correlation filter 445 at the base station 25 detects a short PN code corresponding with a request to be placed in the active mode.

Regardless of the short PN code received in a time slot, the information from the field unit 42A is monitored by pulse timing analyzer 424. It is then determined whether the message transmission by a corresponding field unit 42A is received early or late within a time slot at base station 25 by analyzing the corresponding signal. Preferably, the strongest received diversity string will be designated as the time alignment string at base station 25 for analyzing timing of the message received on the heartbeat channel 55H.

Precise timing alignment is achieved using the correlation profile of the pilot in a particular string, which is analyzed as mentioned using correlation filters. The output of the correlation filters 440, 445 consist of 256 samples, which represent 64 lags at 4 samples per lag. The 256 sample output-window represents the total correlation time span of base station 25. Preferably, the time alignment point is sample number 80 which allows 20 lags for precursor and 44 lags for post cursor channel information.

Generally, the computation of the time alignment error is based on a determination of where the centroid or peak lies in a given sample string. For example, each field unit transmitting in its assigned time slot includes a marker, i.e., the peak signal, located at a predetermined position within a time slot. The strongest pilot path for the channel and 2 samples on either side of the main path, i.e., 1 and ¼ chips, is statistically analyzed to determine the centroid or peak of a marker within a time slot. Location of the centroid, L, of the samples in FIG. 6 is calculated based on the following equation:

$$L = \frac{\sum [t \times Q(t)]}{\sum Q(t)}$$

where t=sample time and Q(t) is the magnitude of a sample at a given time.

Figure 6:
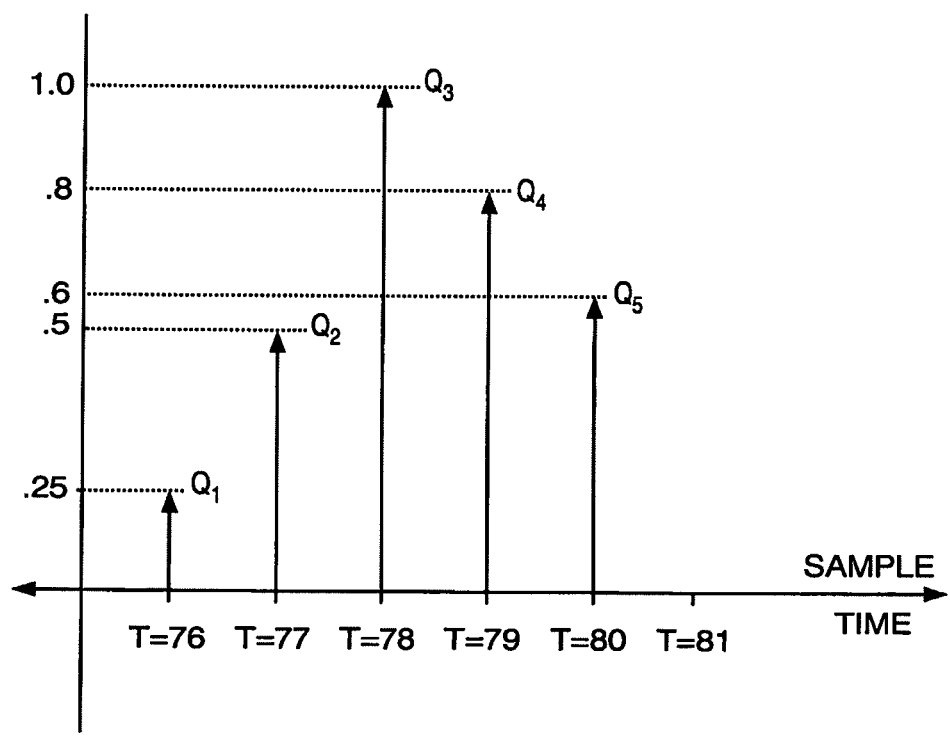
FIG. 6 is a graph illustrating pulse sampling of a timing mark for synchronizing forward and reverse channels according to the principles of the present invention.

For example, L is calculated based on the results as shown in FIG. 6:

$$L = \frac{(.25*76) + (.5*77) + (1.0*78) + (.8*79) + (.6*80)}{.25 + .5 + 1.0 + .8 + .6}$$

$$L = 78.317$$

Again, the timing alignment error is determined by comparing the timing of the computed centroid to the desired time set point of 80, which is chosen as the reference point for timing alignment within a time slot. Since the centroid in the example above is estimated to be 78.317, timing is early and, therefore, the corresponding LQM timing bit 311 will be set to a logic "one" indicating that the corresponding field unit should advance its timing by ⅛ of a chip. This overall feedback technique in the present invention ensures continuous fine tuning of time ahead alignment between the forward link LQM channel 60L and each of multiple field units 42 transmitting on the reverse link heartbeat channel 55H.

Preferably, the time error is calculated by taking the integer of twice the difference between the desired set point sample 80 and L. For example, time_error=integer [(L−80)*2]

If the time_error result is negative, the LQM timing bit 311 is set to a logic "one." Conversely, it is set to a logic "zero" when time_error is positive.

Processor 426 analyzes timing data and generates time_error for synchronizing the reverse link heartbeat channel 55H and forward link LQM channel 60L. LQM time slotted messages are then transmitted by LQM signal generator 450 on LQM channel #1 60L and specifically LQM timing bit 311 to provide timing adjustments at the corresponding field unit 42A as mentioned.

If a field unit 42A in the standby mode transmits a request to go active, such a request is detected at heartbeat correlation filter 445. The timing characteristics of an active mode request detected at heartbeat correlation filter 445 is also analyzed to determine timing errors as described above for maintaining alignment on a particular link between the base station 25 and each field unit 42A.

If resources are available for allocating traffic channels 55T, the requesting field unit 42A is placed in the active mode by base station 25, where configuration details are handled by processor 426. For example, information of new LQM time slot assignments, i.e., assignment of an active mode time slot A1-A16, is achieved by sending messages to a corresponding field unit 42A over the paging channel 60P. Reverse link traffic channels 55T are then allocated for transferring a data payload from the field unit 42A to the base station 25.

While in the active mode, synchronization of the forward and reverse link is maintained between the LQM channel 60L and traffic channels 55T since the heartbeat channel time slot is no longer dedicated on the reverse link 65 to the field unit 42A.

Messages transmitted by a field unit 42A in the active mode are transmitted to base station 25 on the traffic channel 55T. The received traffic channel signal is fed into the traffic channel correlation filter 430 for detection of a timing marker. Preferably, the field unit 42A transmits a sequence of 32 pilot symbols in an assigned time slot as a timing marker. The traffic channel 55T is then analyzed by pulse timing analyzer 420 where it is determined whether messages transmitted by the field unit 42A on the traffic channel 55T are early or late with respect to a desired synchronization of the field unit 42A with the base station 25.

The process of analyzing a pulse or marker for estimating the centroid is similar to that described earlier in the specification for messages and corresponding markers (short PN codes) on the heartbeat channel 55H. However, in the present case, pilot symbols in the traffic channels 55T are used as a timing reference mark rather than short PN codes. Again, see FIG. 6 and related discussion above for details.

Similar to alignment of the heartbeat channel 55H and LQM channel 60L, timing synchronization is maintained between the reverse link traffic channels 55T and forward link LQM channel 60L while a field unit 42A is in the active mode. Timing alignment of the base station 25 and field 42A unit is based upon the LQM timing bit 311 in an assigned active time slot A1-A16 on the forward link 70.

When the receipt of data messages transmitted by the active field unit 42A are received early or late with respect to an assigned time slot, the LQM timing bit 311 is set accordingly to advance or retard timing of future message transmissions on the traffic channels 55T.

One or multiple traffic channels 55T are optionally analyzed to coordinate timing alignment between the reverse link 65 and forward link 70.

As mentioned, the access channel 55A is used by field units 42 to transmit requests for establishing communication links with the base station 25. Typically, messages on the access channel 55A are transmitted on a random basis. Hence, a message collision may occur if two or more link requesting field units 42 happen to transmit a link request message on the access channel 55A at the same time.

If a collision is detected on the access channel 55A, the collision is made known to the field units 42 based upon a message generated by paging channel signal generator 455 over paging channel 60P. Each field unit 42A will then retransmit their request to establish a new link on the access channel 55A based on a random back off time, making it less likely that a collision will occur in a second or other subsequent attempt.

The access channel 55A, also shown in FIG. 4, is fed into access channel correlation filter 435. Preferably, field units 42 transmit a sequence of 32 pilot symbols including data identifying the link requesting field unit 42A. A received sequence of pilot symbols is analyzed by pulse timing analyzer 422 to determine initial timing information of the access channel 55A with respect to the base station 25. Since the field units randomly transmit on the access channel 55A, it is necessary to determine an initial timing error between the field unit 42A and base station 25 for achieving a coarse synchronization of the forward and reverse link channels.

If it is determined by base station 25 that a link will be established between base station 25 and requesting field unit 42A, an appropriate acknowledgment message is transmitted over the forward paging channel 60P to the base station 25. Among other information transmitted over the forward paging channel 60P to the field unit 42A, a heartbeat time slot assignment, an LQM time slot assignment, and synchronization information is also transmitted to field unit 42A.

Coarse timing correction information is transmitted on the forward paging channel 60P to roughly synchronize the link requesting field unit 42A with respect to base station 25. A 10 bit signed number is transmitted to the field unit 42A indicating an amount to advance or retard timing with respect to the previous link request message transmitted on the access channel 55A and received at the base station. Preferably, each least significant bit (LSB) in the 10-bit signed number is weighted such as 16 chips per LSB. Based on this timing correction information, the corresponding field unit 42A adjusts its coarse timing relative to the base station 25. Thereafter, messages are then transmitted in the appropriate reverse link time slot on the heartbeat channel 55H or traffic channel 55T, which will be analyzed at the base station 25 as mentioned above to fine-tune synchronization of field unit 42A.

In addition to transmitting in the appropriate time slot, synchronization with base station 25 renders it possible for the field unit 42A to receive information in its assigned time slot.

Figure 5A:
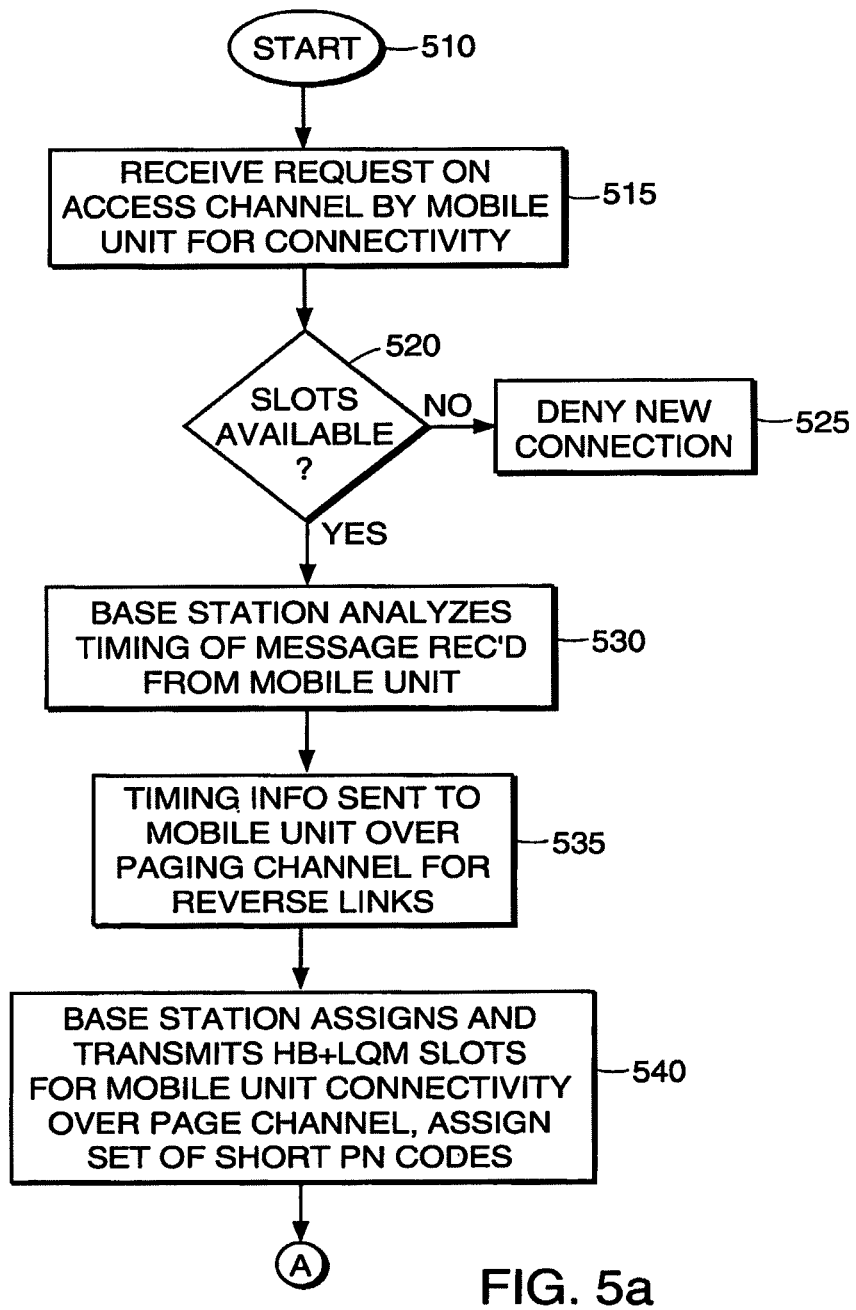
FIGS. 5a and 5b are a flow chart describing the process of synchronizing forward and reverse channels according to the principles of the present invention.
Figure 5B:
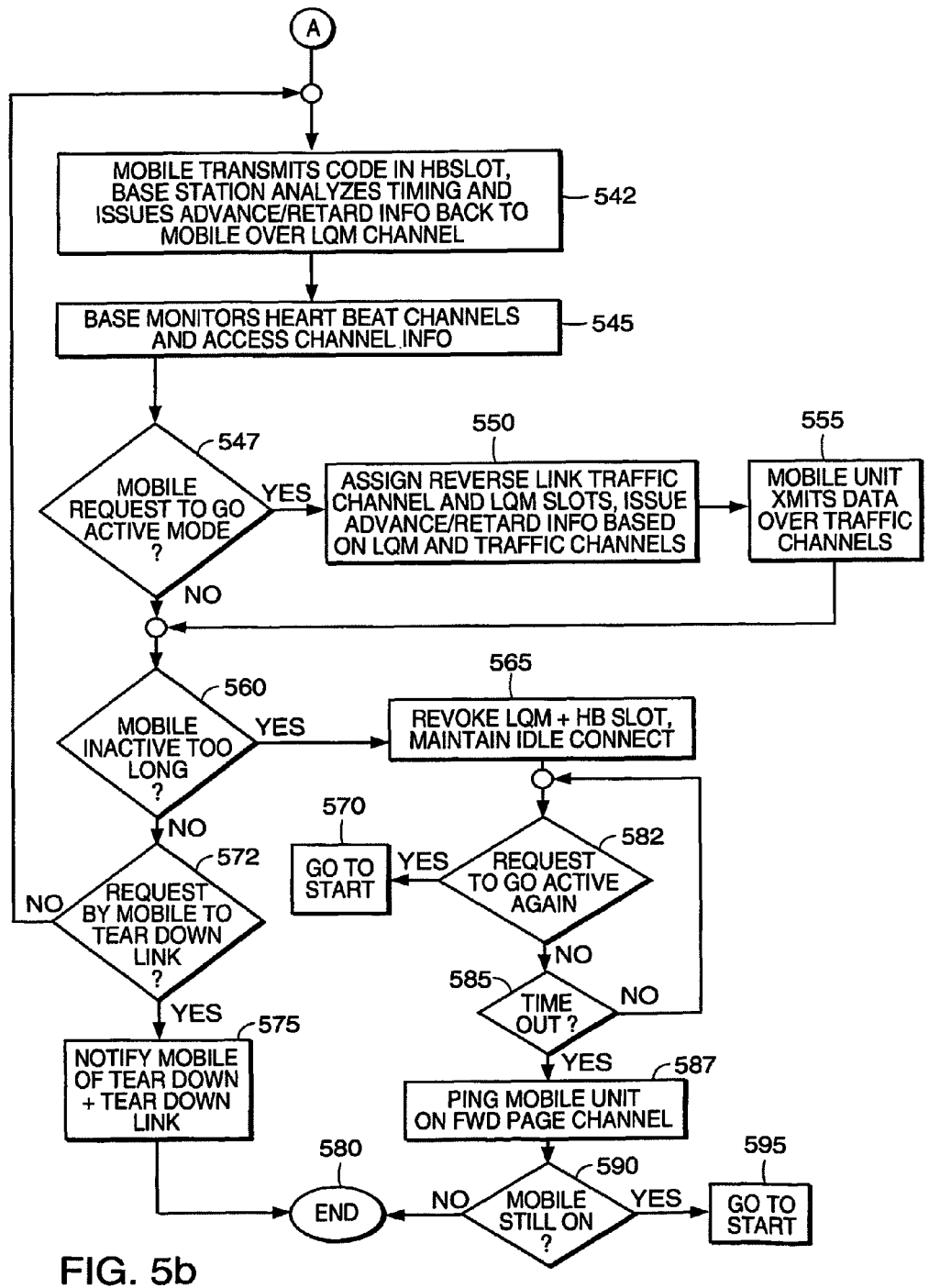

FIGS. 5a and 5b is a flow chart providing details of how a wireless communication link is established between a field unit 42A and the base station 25. There are occasionally multiple field units requesting communication links in a particular service area, where each mobile or field unit 42A is typically located at a different distance with respect to the base station 25. Hence, the time it takes for a signal to travel from a particular field unit to base station 25 is different for each field unit. Precise timing alignment of a specific field unit 42A and base station 25 can be helpful to avoid or minimize collisions between field units transmitting in adjacent time slots.

Not only does distance from a field unit 42A to base station 25 effect timing alignment, so does the environment in which a field unit 42A transmits a message. For example, building structures, atmospheric conditions and other geographical terrain will effect the path of a signal transmitted from a field unit 42A to the base station 25. A field unit 42A changing position merely a few feet in several seconds therefore can have a substantial impact on timing of a signal path, thus, effecting timing alignment between a reverse link 65 and forward link 70. Based on the principles of the present invention, the previously described method of continuously adjusting transmissions in the shared reverse channel 65 minimizes collisions among messages transmitted to the base station 25 in adjacent time slots.

Step 510 in FIG. 5a shows the entry point of the flow chart for establishing a wireless communication link. The access channel 55A is monitored by base station 25 to detect requests by field units 42 to establish wireless links with the base station 25 in step 515. A link request message received at base station 25 includes a sequence of pilot symbols followed by data identifying the link requesting field unit 42A. Based on this information, the base station 25 is able to access details regarding a particular subscriber and the characteristics of the corresponding field unit 42A.

As shown in step 520, if no time slots are available for establishing a new link, the connection request is denied in step 525. Messages related to the denial of a new link are transmitted to the corresponding field unit 42A on the forward link paging channel 60P.

If resources are available to establish a new link in step 520, base station 25 analyzes the timing of the request message received by a field unit 42A on the access channel 55A in step 530. As mentioned, the sequence of 32 pilot symbols are analyzed to determine the location of the peak pulse or marker in the reverse link 65. Based on the time when this potentially random link request message is received with respect to the base station's master time reference EPOCH mark M1 and the distance that the field unit 42A is located from the base station 25, a coarse time adjustment message is generated by the base station 25 to synchronize timing between the link requesting field unit 42A and base station 25. This coarse timing information, preferably a 10 bit signed number indicating how to align the field unit with the base station EPOCH is sent to the field unit 42A over the forward link paging channel 60P in step 535. The field unit 42A then adjusts its timing accordingly so that it transmits messages in its assigned time slot on the reverse link 65 and also listens during the appropriate time slot to receive messages from base station 25.

Additionally in step 540, base station 25 assigns two time slots to the link requesting field unit 42A over paging channel 60P. One assignment is a time slot in the forward link LQM channel 60L, indicating the time slot in which the field unit 42A is to receive LQM messages from the base station 25. The second assignment is a time slot in the reverse link heartbeat channel 55H in which the field unit 42A is to transmit messages to base station 25. Based upon these time slot assignments, the base station 25 and field units 42 determine to which link between the base station 25 and one of many field units 42 a message is directed.

A set of short PN codes is also transmitted to the field unit 42A over the forward link paging channel in step 540. Each short PN code corresponds to a predefined message that is potentially transmitted in a reverse link time slot to base station 25. For example, one code corresponds with a request by the field unit 42A to remain in the standby mode while another code corresponds with a request by the field unit to be placed in the active mode. Short PN codes can be chosen from a pool of 232 unique codes, where none of the codes in the assigned sets of codes to each field unit is duplicated. However, a common set of codes can be assigned for use by multiple field units 42.

While in the standby mode, base station 25 monitors periodic messages in an assigned time slot for a particular short PN code transmitted by the corresponding field unit 42A. For example, the short PN code pulse is analyzed at base station 25 to correct timing alignment as mentioned between the forward link LQM channel 60L and reverse link heartbeat channel 55H. If a message in a time slot is early or late at base station 25, timing of the short PN codes on reverse link heartbeat channel 55H is appropriately retarded or advanced based upon the LQM timing bit 311 for a particular field unit 42A in step 542.

Timing adjustments are made at the field unit 42A based upon the state of the LQM timing bit 311. Initially, timing is corrected by ⅛ of a chip in the appropriate direction depending on the state of the bit. If the field unit receives 8 retard bits in a row or 8 advance bits in a row over as many EPOCHs, timing adjustments at the base station are based on ½ of a chip instead of ⅛ of a chip for the following same state LQM bits 311. In this way, synchronization between the base station 25 and field unit 42A is achieved more quickly.

Once the field unit 42A determines that timing is overcorrected, i.e., the polarity of the LQM timing bit 311 changes, the timing adjustments at the field unit 42A revert back to ⅛ of a chip adjustments for each received LQM timing bit 311. When synchronization is achieved between the field unit 42A and base station 25, the LQM timing bit 311 will typically be set to alternating logic ones and zeros for several successive EPOCH cycles. In other words, timing at the field unit 42A will jitter ⅛ of a chip when synchronization is practically achieved between base station 25 and field unit 42A.

If field unit 42A receives another 8 cycles of timing adjustment correction in the same direction such that the state 16 successive LQM bits 311 are the same state, the time adjust correction is set to 1 chip per received LQM timing bit 311. As stated earlier, when over-correction is detected, chip adjustments at the field unit 42A are set to ⅛ of a chip again.

In addition to monitoring timing pulses for aligning message transmissions of each field unit 42A, base station 25 monitors the short PN code received in each time slot on the heartbeat channel 55H in step 545. It is then determined in step 547 whether the short PN code received at base station 25 corresponds to a request by the field unit 42A to be set to the active mode. If so, the base station allocates appropriate resources such as traffic channels 55T in the reverse link 65 to support the data transfer in step 550. Additionally, the field unit 42A is assigned an active time slot, i.e., one available time slot between A1-A16, in the forward link LQM channel 60L. While in the active mode, as mentioned, the field unit 42A maintains synchronization with the base station 25 based on a sequence of well-placed pilot symbol markers in the traffic channels 55T, upon which the base station 25 issues timing adjustments in the appropriate time slot of the forward link LQM timing bit 311. In step 555, the field unit 42A transmits data in the reverse link traffic channels 55T before returning to the main loop again at step 560.

If a field unit 42A has not been in the standby mode too long in step 560, base station 25 determines in step 572 whether the field unit 42A has made a request to terminate a wireless link between base station 25 and field unit 42A. Without detecting a request to tear down a link, processing loops back to step 542 for fine-tuning timing adjustments as previously described.

If field unit 42A makes a request to tear down a corresponding link in step 572, base station 25 acknowledges such a request in step 575 by sending a message to field unit 42A. Additionally, the base station 25 tears down the communication link. This is one way of terminating the flow chart as shown in step 580.

Referring again to step 560, if it is determined that field unit 42A is inactive too long, i.e., in standby mode not transmitting data, the base station revokes the assigned LQM and heartbeat time slots for use by other users and maintains an idle connection with the field unit 42A in step 565.

When field unit 42A requests to go active again in step 582, the process flow continues at the beginning of the flow chart to reestablish a link in step 570. In such a case, connectivity is reestablished based in part on the prior connection. For example, it is not necessary to go through the entire configuration process as data maintained with respect to a recently active link is advantageously used to minimize the overhead associated with reviving the previous connection.

Flow continues at step 585 if the base station 25 fails to detect a request by the field unit 42A to go active again. If the base station 25 fails to receive a response from an idle field unit 42A in a specified time out period as in step 585, the base station pings the field unit on forward page channel 60P to elicit a response by the field unit 42A in step 587. If the field unit 42A does not respond in step 590, it is assumed that the field unit 42A is shut down and an idle connection is no longer maintained for that particular field unit 42A. If the field unit 42A responds to the ping in step 590, the routine continues in step 595 to reestablish the link as a standby connection at the start of the flow chart.

While this invention has been particularly shown and described with references to preferred embodiments thereof, it will be understood by those skilled in the art that various changes in form and details may be made therein without departing from the scope of the invention encompassed by the appended claims.

What is claimed is:

1. A method for supporting wireless communications, the method comprising:
   assigning a plurality of codes to a field unit;
   transmitting an indication of the plurality codes to the field unit;
   receiving a first message in at least one time slot, wherein the first message includes one of the plurality of codes, and the one of the plurality of codes is associated with a type of field unit request;
   analyzing the one of the plurality of codes to determine a timing adjustment to be made at the field unit to synchronize the field unit with a base station; and
   transmitting a second message to the field unit that includes the timing adjustment, wherein the timing adjustment indicates an amount to advance timing.

2. The method of claim 1 wherein the one of the plurality of codes comprises a plurality of symbols.

3. The method of claim 1, wherein the timing adjustment is a single bit.

4. The method of claim 1, wherein the plurality of codes comprise a plurality of groups of one or more codes, and each of the plurality of groups of one or more codes is associated with a type of field unit request.

5. The method of claim 1, wherein each of at least two of the plurality of codes are respectively associated with a different type of field unit request.

6. The method of claim 1, wherein the type of field unit request is a request to enter an active mode.

7. The method of claim 1, wherein the type of field unit request is a request for bandwidth.

8. The method of claim 1, wherein the type of field unit request is a request by the field unit to transmit data.

9. A base station operable in a wireless communication network, the base station comprising:
   a transmitter configured to transmit an indication of a plurality of codes to a field unit; and
   a receiver configured to receive a message containing an code from a field unit to determine a timing adjustment to be made at the field unit to synchronize the field unit with the base station, wherein the received code is associated with a type of field unit request;
   wherein the transmitter is further configured to transmit a feedback message to the field unit containing the timing adjustment, wherein the timing adjustment indicates an amount to advance timing.

10. The base station of claim 9, wherein a first channel supports communication from the base station to the field unit and a second channel supports communication from the field unit to the base station and wherein the first channel and the second channel comprise time slots.

11. The base station of claim 9, wherein the receiver is configured to receive the message containing the code over a plurality of symbols.

12. The base station of claim 9, wherein the plurality of codes comprise a plurality of groups of one or more codes, and each of the plurality of groups of one or more codes is associated with a type of field unit request.

13. The base station of claim 9, wherein each of at least two of the plurality of codes are respectively associated with a different type of field unit request.

14. The base station of claim 9, wherein the type of field unit request is a request to enter an active mode.

15. The base station of claim 9, wherein the type of field unit request is a request for bandwidth.

16. The base station of claim 9, wherein the type of field unit request is a request by the field unit to transmit data.

17. A field unit operable in a wireless communication network, the field unit comprising:
   a receiver configured to receive an indication of a plurality of codes from a base station; and
   a transmitter configured to transmit an code selected from the plurality of codes received from the base station, wherein the selected code is associated with a type of field unit request;
   wherein the receiver is further configured to receive, from the base station, a feedback message based on the transmitted code, wherein the feedback message contains a timing adjustment that indicates an amount to advance timing.

18. The field unit of claim 17, wherein a first channel supports communication from a base station to the field unit and a second channel supports communication from the field unit to the base station and the first channel and the second channel comprise time slots.

19. The field unit of claim 17, wherein the transmitter is configured to transmit the code over a plurality of symbols.

20. The field unit of claim 17, wherein the plurality of codes comprise a plurality of groups of one or more codes, and each of the plurality of groups of one or more codes is associated with a type of field unit request.

21. The field unit of claim 17, wherein each of at least two of the plurality of codes are respectively associated with a different type of field unit request.

22. The field unit of claim 17, wherein the type of field unit request is a request to enter an active mode.

23. The field unit of claim 17, wherein the type of field unit request is a request for bandwidth.

24. The field unit of claim 17, wherein the type of field unit request is a request by the field unit to transmit data.

25. A method for use in a field unit operable in a wireless communication network, the method comprising:
   receiving an indication of a plurality of codes from a base station;
   selecting an code from the plurality of codes received from the base station, wherein the selected code is associated with a type of field unit request;
   transmitting the selected code to the base station; and
   receiving a message, from the base station, based on the transmitted selected code, wherein the message contains a timing adjustment that indicates an amount to advance timing.

26. The method of claim 25, further comprising: adjusting transmission timing based on the timing adjustment.

27. The method of claim 25, wherein a first channel supports communication from a base station to the field unit and a second channel supports communication from the field unit to the base station and the first channel and the second channel comprise time slots.

28. The method of claim 25, wherein the transmitter is configured to transmit the selected code over a plurality of symbols.

29. The method of claim 25, wherein the plurality of codes comprise a plurality of groups of one or more codes, and each of the plurality of groups of one or more codes is associated with a type of field unit request.

30. The method of claim 25, wherein each of at least two of the plurality of codes are respectively associated with a different type of field unit request.

31. The method of claim 25, wherein the type of field unit request is a request to enter an active mode.

32. The method of claim 25, wherein the type of field unit request is a request for bandwidth.

33. The method of claim 25, wherein the type of field unit request is a request by the field unit to transmit data.

* * * * *